United States Patent
Imaizumi et al.

(10) Patent No.: US 10,442,442 B2
(45) Date of Patent: Oct. 15, 2019

(54) WORK VEHICLE PERIPHERY MONITORING SYSTEM AND WORK VEHICLE PERIPHERY MONITORING METHOD

(71) Applicant: Komatsu Ltd., Tokyo (JP)

(72) Inventors: Masaaki Imaizumi, Tokyo (JP); Masataka Ozaki, Tokyo (JP); Takeshi Kurihara, Tokyo (JP)

(73) Assignee: Komatsu LTD., Tokyo (JP)

( * ) Notice: Subject to any disclaimer, the term of this patent is extended or adjusted under 35 U.S.C. 154(b) by 0 days.

(21) Appl. No.: 15/756,265

(22) PCT Filed: Dec. 6, 2017

(86) PCT No.: PCT/JP2017/043845
§ 371 (c)(1),
(2) Date: Feb. 28, 2018

(87) PCT Pub. No.: WO2019/111357
PCT Pub. Date: Jun. 13, 2019

(65) Prior Publication Data
US 2019/0168776 A1  Jun. 6, 2019

(51) Int. Cl.
*B60W 50/14* (2012.01)
*B60W 50/08* (2012.01)
*G06K 9/00* (2006.01)

(52) U.S. Cl.
CPC .......... *B60W 50/14* (2013.01); *B60W 50/085* (2013.01); *B60W 50/087* (2013.01); *G06K 9/00805* (2013.01); *B60W 2050/143* (2013.01)

(58) Field of Classification Search
CPC ............ G01C 21/3647; G01C 21/3661; G06K 9/00362; G06K 9/00268; G06K 9/00369;
(Continued)

(56) References Cited

U.S. PATENT DOCUMENTS 6,173,225 B1 * 1/2001 Stelzle ................ A01B 63/1117
                                                             180/53.6
7,062,054 B2 * 6/2006 Nishikawa ............. H04R 1/227
                                                             381/182
(Continued)

FOREIGN PATENT DOCUMENTS

JP    2001-032332 A    2/2001
JP    2008-181337 A    8/2008
(Continued)

OTHER PUBLICATIONS

International Search Report dated Feb. 27, 2018, issued for PCT/JP2017/043845.

*Primary Examiner* — Daniel Previl
(74) *Attorney, Agent, or Firm* — Locke Lord LLP

(57) ABSTRACT

A periphery monitoring system includes an operation instruction output unit which outputs an operation instruction to a warning device provided in a work vehicle based on detection data of an object detection device detecting an object in a periphery of the work vehicle, an invalidating unit which invalidates the operation instruction based on an invalidating instruction output from a cancel operation device provided in a driving room of the work vehicle, and a validating unit which validates the invalidated operation instruction based on detection data of a boarding state detection device detecting a specific boarding state of a passenger in the driving room.

11 Claims, 12 Drawing Sheets

(58) Field of Classification Search
CPC .......... G06K 9/00845; G06K 7/10366; G06K 7/10009; G06K 9/00785; G11B 31/00; G11B 27/00; H04M 1/6083; H04M 1/7255; B60Q 9/00; B60R 21/01516; B60R 21/0152; B60R 21/01532; B60R 21/01534; B60R 21/01536; B60R 21/01546; B60R 21/01548; B60R 21/01554; F02D 2200/101; F02D 2250/21; F02D 2250/24; F02D 2250/28; F02D 29/00; F02D 41/021; F02D 41/12; F02D 41/307; F02D 41/029; F02D 2200/604; F02D 2041/026; F02D 41/1448; F02D 2200/0812; F02D 2200/60; F02D 29/02; F02D 31/001; F02D 41/405; F02D 9/06; F02D 29/04; F02D 41/0245; G01S 15/04; G01S 15/42; G01S 15/88; G01S 19/13; G06F 17/30764; G06Q 30/06; G07B 1/00; G07B 5/00; G07C 5/006; G07C 5/085; G10L 15/02; H04R 2499/13; H04S 2400/11; H04S 7/30; H04W 4/027
USPC ....... 340/425.5, 426.36, 431, 433, 438, 439, 340/507, 534, 545.6, 568.8, 636.1, 686.6, 340/692
See application file for complete search history.

(56) References Cited

U.S. PATENT DOCUMENTS

| | | | |
|---|---|---|---|
| 2016/0059775 A1* | 3/2016 | Gorse | ..................... G01S 19/13 |
| | | | 701/468 |
| 2016/0265196 A1* | 9/2016 | Shimizu | ................. B60K 35/00 |
| 2017/0305018 A1 | 10/2017 | Machida et al. | |

FOREIGN PATENT DOCUMENTS

| | | | | |
|---|---|---|---|---|
| JP | 2010-135098 | A | | 6/2010 |
| JP | 2011-183979 | A | | 9/2011 |
| JP | 2012-130207 | A | | 7/2012 |
| JP | 2014-189089 | | * | 3/2013 |
| JP | 2013-199763 | A | | 10/2013 |
| JP | 2014-106786 | A | | 6/2014 |
| JP | 2014-161087 | A | | 9/2014 |
| JP | 2014-189089 | A | | 10/2014 |
| WO | 2015125979 | A1 | | 8/2015 |
| WO | 2016/016978 | A1 | | 2/2016 |

* cited by examiner

WORK VEHICLE PERIPHERY MONITORING SYSTEM AND WORK VEHICLE PERIPHERY MONITORING METHOD

FIELD

The present invention relates to a work vehicle periphery monitoring system and a work vehicle periphery monitoring method.

BACKGROUND

In a technical field relating to a work vehicle, a periphery monitoring system which monitors a peripheral state of a work vehicle by using a radar device as an object detection device has been known as disclosed in Patent Literature 1.

CITATION LIST

Patent Literature

Patent Literature 1: Japanese Laid-open Patent Publication No. 2014-161087 A

SUMMARY

Technical Problem

In a case where the object detection device detects an object in the periphery of the work vehicle, for example, the periphery monitoring system outputs a warning sound to a passenger (for example, an operator) of the work vehicle. When the warning sound is output in a case where the object is an obstacle affecting the operation of the work vehicle, the passenger of the work vehicle can recognize a state where an obstacle exists in the periphery of the work vehicle. However, in a case where the work vehicle enters a building or performs a work inside the building, the object detection device detects, for example, a wall surface of the building as an obstacle and outputs an unnecessary warning sound in a state where the obstacle does not exist in the periphery of the work vehicle or the passenger clearly recognizes a state in the periphery of the work vehicle. As a result, the passenger feels troublesome.

When the work vehicle is provided with a cancel operation device for stopping the output of the unnecessary warning sound, the passenger can stop the output of the unnecessary warning sound by operating the cancel operation device according to the operator's will. However, if the passenger first driving the work vehicle operates the cancel operation device to stop the output of the warning sound and the next passenger gets on the work vehicle in a case where one work vehicle is alternately driven by a plurality of operators or is driven by a service man, there is a possibility that the necessary warning sound may not be output when the work vehicle approaches the obstacle while the next passenger drives the work vehicle.

An object of an aspect of the invention is to suppress an output of an unnecessary warning sound and to output a necessary warning sound.

Solution to Problem

According to an aspect of the present invention, a work vehicle periphery monitoring system comprises: an operation instruction output unit which outputs an operation instruction to a warning device provided in a work vehicle based on detection data of an object detection device detecting an object in a periphery of the work vehicle; an invalidating unit which invalidates the operation instruction based on an invalidating instruction output from a cancel operation device provided in a driving room of the work vehicle; and a validating unit which validates the invalidated operation instruction based on detection data of a boarding state detection device detecting a specific boarding state of a passenger in the driving room.

Advantageous Effects of Invention

According to an aspect of the invention, it is possible to suppress an output of an unnecessary warning sound and to output a necessary warning sound.

DESCRIPTION OF EMBODIMENTS

Hereinafter, embodiments according to the invention will be described with reference to the drawings, but the invention is not limited thereto. Components to be described below can be appropriately combined with each other. Further, there is a case where a part of the components are not used.

First Embodiment

[Outline of Wheel Loader]

Figure 1:
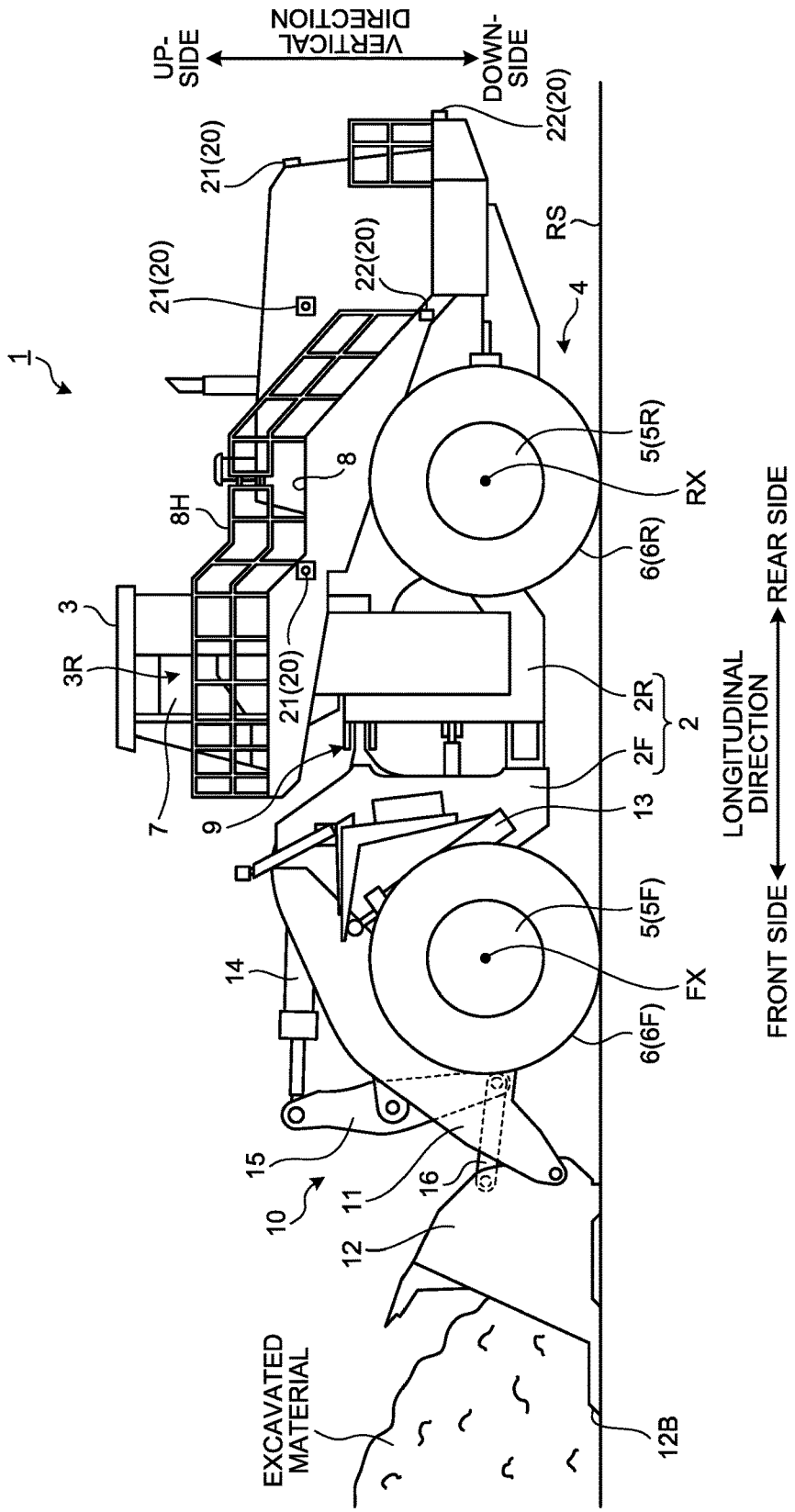
FIG. 1 is a side view illustrating an example of a work vehicle according to a first embodiment.

A first embodiment will be described. FIG. 1 is a side view illustrating an example of a work vehicle 1 according to the embodiment. In the embodiment, the work vehicle 1 is a wheel loader 1 which is a kind of an articulated work vehicle. The wheel loader 1 loads an excavated material scooped by a bucket 12 onto a transportation vehicle or discharges the excavated material to a predetermined discharge place.

As illustrated in FIG. 1, the wheel loader 1 includes a vehicle body 2, a cab 3, a traveling device 4, and a working machine 10.

The vehicle body 2 includes a front vehicle body part 2F and a rear vehicle body part 2R. The front vehicle body part 2F and the rear vehicle body part 2R are bendably connected to each other through an articulation mechanism 9. A steering cylinder (not illustrated) is provided in the articulation mechanism 9 and the steering cylinder is moved in a telescopic manner so that the vehicle body 2 is bent.

The cab 3 is supported by the vehicle body 2. The cab 3 is provided with a driving room 3R. The wheel loader 1 is driven by a passenger getting on the driving room 3R. The passenger includes an operator who performs an actual work by driving the wheel loader 1 and a service man who performs a maintenance work of the wheel loader 1. The actual work includes at least one of an excavation work for excavating a material to be excavated by using the working machine 10 and a transportation work for carrying and discharging an excavated material.

The traveling device 4 supports the vehicle body 2. The traveling device 4 includes a vehicle wheel 5. The vehicle wheel 5 is rotated by power generated by an engine mounted on the vehicle body 2. A tire 6 is attached to the vehicle wheel 5. The vehicle wheel 5 includes two front wheels 5F which are supported by the front vehicle body part 2F and two rear wheels 5R which are supported by the rear vehicle body part 2R. The tire 6 includes a front tire 6F which is attached to the front wheel 5F and a rear tire 6R which is attached to the rear wheel 5R. The traveling device 4 can travel on a ground RS. The traveling device 4 includes an articulation mechanism 9 which bends and turns the vehicle body 2.

The front wheel 5F and the front tire 6F are rotatable about a rotation axis FX. The rear wheel 5R and the rear tire 6R are rotatable about a rotation axis RX.

In the description below, a direction parallel to the rotation axis FX of the front tire 6F will be appropriately referred to as the vehicle width direction, a direction orthogonal to a contact surface of the front tire 6F contacting the ground RS will be appropriately referred to as the vertical direction, and a direction orthogonal to both the vehicle width direction and the vertical direction will be appropriately referred to as the longitudinal direction. In a case where the wheel loader 1 travels straight ahead, the rotation axis FX and the rotation axis RX are parallel to each other.

Further, in the description below, a position or a direction close to the center of the vehicle body 2 in the vehicle width direction will be appropriately referred to as the inside or the inward direction in the vehicle width direction and a position or a direction far from the center of the vehicle body 2 will be appropriately referred to as the outside or the outward direction in the vehicle width direction. Further, one side based on a driver seat 17 (see FIG. 3) of the driving room 3R in the vehicle width direction will be appropriately referred to as the right side or the rightward direction and a side or a direction opposite to the right side or the rightward direction will be appropriately referred to as the left side or the leftward direction. Further, a position or a direction close to the working machine 10 based on the driver seat 17 of the driving room 3R in the longitudinal direction will be appropriately referred to as the front side or the forward direction and a side or a direction opposite to the front side or the forward direction will be appropriately referred to as the rear side or the backward direction. Further, a position or a direction close to a contact surface of the front tire 6F in the vertical direction will be appropriately referred to as the downside or the downward direction and a side or a direction opposite to the downside or the downward direction will be appropriately referred to as the upside or the upward direction.

An entrance 7 is provided at the left side of the driving room 3R. The entrance 7 is opened or closed by a door. Further, a step 8 is provided at the left side of the rear vehicle body part 2R. A handrail 8H is provided along the step 8. The passenger can enter the driving room 3R through the entrance 7 after getting on the step 8. Further, the passenger who exists in the driving room 3R can get off the step 8 after leaving from the driving room 3R through the entrance 7.

The working machine 10 is supported by the vehicle body 2. At least a part of the working machine 10 is disposed at the front side of the front tire 6F. The working machine 10 includes a boom 11 which is movably connected to the vehicle body 2, a bucket 12 which is movably connected to the boom 11, a bell crank 15, and a link 16.

The boom 11 is operated by power generated by a boom cylinder 13. One end portion of the boom cylinder 13 is connected to the vehicle body 2. The other end portion of the boom cylinder 13 is connected to the boom 11. When the passenger operates a boom operation lever 18H, the boom cylinder 13 moves in a telescopic manner. When the boom cylinder 13 moves in a telescopic manner, the boom 11 moves upward or downward.

The bucket 12 is a working member including a tip portion 12B with a cutting edge. The bucket 12 is disposed at the front side of the front tire 6F. The bucket 12 is connected to a front end portion of the boom 11. The bucket 12 is operated by power generated by a bucket cylinder 14. A center portion of the bell crank 15 is rotatably connected to the boom 11. One end portion of the bucket cylinder 14 is connected to the vehicle body 2. The other end portion of the bucket cylinder 14 is connected to one end portion of the bell crank 15. The other end portion of the bell crank 15 is connected to the bucket 12 through the link 16. When the passenger operates a bucket operation lever 18I, the bucket cylinder 14 moves in a telescopic manner. When the bucket cylinder 14 moves in a telescopic manner, the bucket 12 performs a dumping operation or a tilting operation.

[Outline of Periphery Monitoring System]

The wheel loader 1 includes a periphery monitoring system 100 which monitors the periphery of the wheel loader 1 and allows the passenger of the wheel loader 1 to recognize the peripheral state of the wheel loader 1. The periphery monitoring system 100 includes an object detection device 20.

Figure 2:
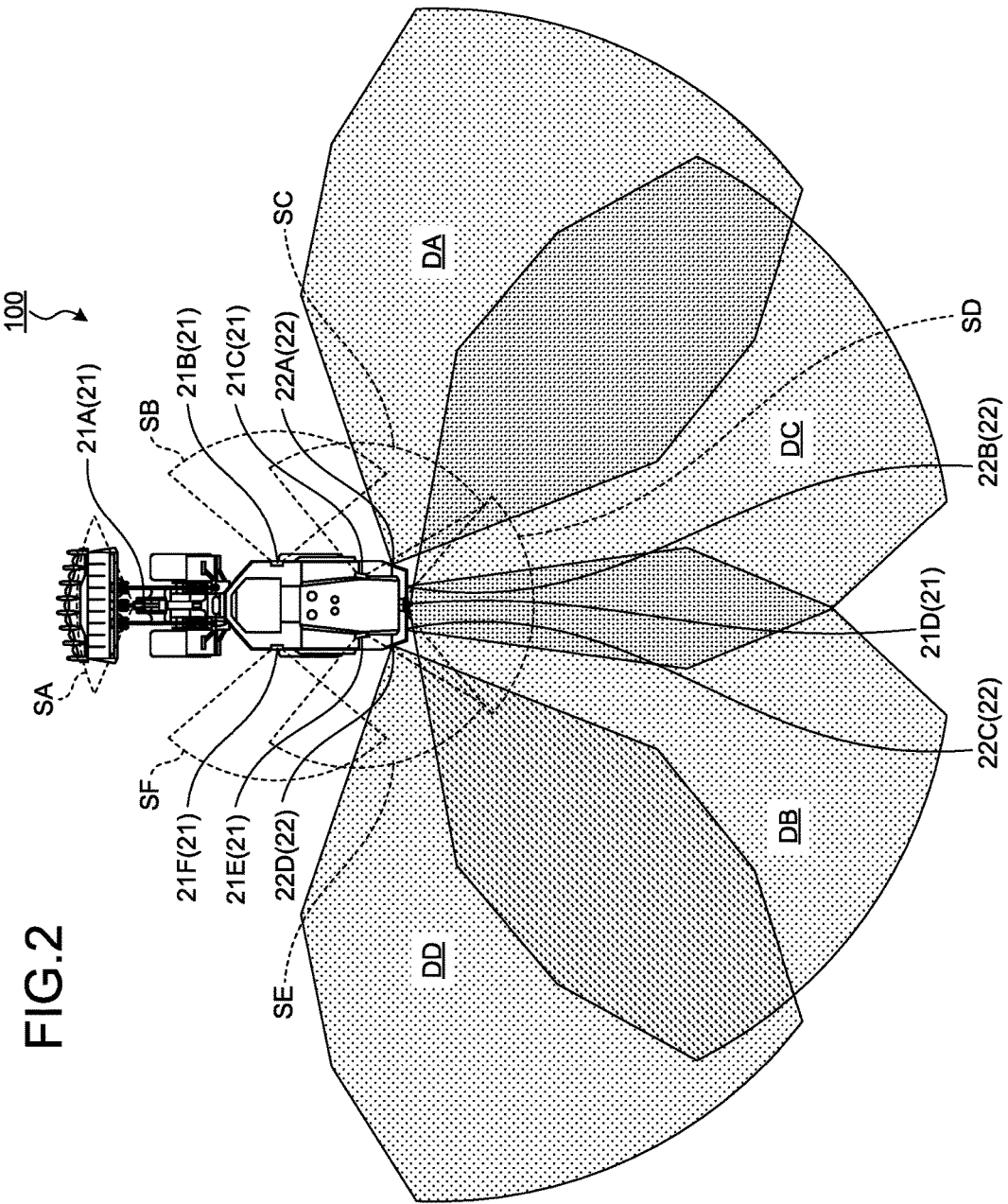
FIG. 2 is a diagram schematically illustrating an example of a range in which an object detection device according to the first embodiment detects an object.

FIG. 2 is a diagram schematically illustrating an example of a range in which the object detection device 20 according to the embodiment detects an object. The object detection device 20 detects an object in the periphery of the wheel loader 1. As illustrated in FIGS. 1 and 2, the object detection device 20 includes a camera 21 which photographs an object in the periphery of the wheel loader 1 and a non-contact sensor 22 which detects an object in the periphery of the wheel loader 1 in a non-contact manner.

A plurality of the cameras 21 is mounted on the wheel loader 1 and acquires an image of an object in the periphery of the wheel loader 1. The camera 21 is provided on an outer surface of the vehicle body 2 of the wheel loader 1. The camera 21 includes a camera 21A which is provided in the front vehicle body part 2F and cameras 21B, 21C, 21D, 21E, and 21F which are provided in the rear vehicle body part 2R.

The camera 21A photographs an imaging area SA defined at the front side of the vehicle body 2. The camera 21B photographs an imaging area SB defined at the right side of the vehicle body 2. The camera 21C photographs an imaging area SC defined at the right side and the right rear side of the vehicle body 2. The camera 21D photographs an imaging area SD defined at the rear side of the vehicle body 2. The camera 21E photographs an imaging area SE defined at the left side and the left rear side of the vehicle body 2. The camera 21F photographs an imaging area SF defined at the left side of the vehicle body 2.

A plurality of the non-contact sensors 22 is mounted on the wheel loader 1 and detects an object in the periphery of the wheel loader 1 in a non-contact manner. The non-contact sensor 22 generates object position data as detection data of the object detection device 20. The object position data includes object existence data and distance data to the object. The non-contact sensor 22 includes a radar device capable of detecting an object in a non-contact manner by emitting radio waves to the object. In addition, the non-contact sensor 22 may include a laser scanner device capable of detecting an object in a non-contact manner by emitting a laser beam to the object. The non-contact sensor 22 may include an ultrasonic sensor device capable of detecting an object in a non-contact manner by emitting ultrasonic waves to the object. The non-contact sensor 22 is provided on an outer surface of the vehicle body 2 of the wheel loader 1. The non-contact sensor 22 includes non-contact sensors 22A, 22B, 22C, and 22D provided in the rear vehicle body part 2R.

The non-contact sensor 22A detects an object in a detection area DA defined at the right side of the vehicle body 2. The non-contact sensor 22B detects an object in a detection area DB defined at the rear side and the left rear side of the vehicle body 2. The non-contact sensor 22C detects an object in a detection area DC defined at the rear side and the right rear side of the vehicle body 2. The non-contact sensor 22D detects an object in a detection area DD defined at the left side of the vehicle body 2.

The object detection device 20 can detect objects existing in different areas in the periphery of the wheel loader 1 by using the plurality of cameras 21 and the plurality of non-contact sensors 22. Additionally, in the embodiment, the object detection device 20 includes both the plurality of cameras 21 and the plurality of non-contact sensors 22, but may include only one of the plurality of cameras 21 and the plurality of non-contact sensors 22. Further, the object detection device 20 may be, for example, one camera 21 or one non-contact sensor 22 provided at the rear end portion of the rear vehicle body part 2R. When the object detection device 20 includes only one or the plurality of cameras 21, image data of the object photographed by the camera 21 is processed by an image processing device. The image processing device processes the image data of the object photographed by the camera 21 and outputs object position data as detection data of the object detection device 20. The object position data includes object existence data and distance data to the object. In this case, the object detection device 20 includes the camera 21 and the image processing device.

[Driving Room]

Figure 3:
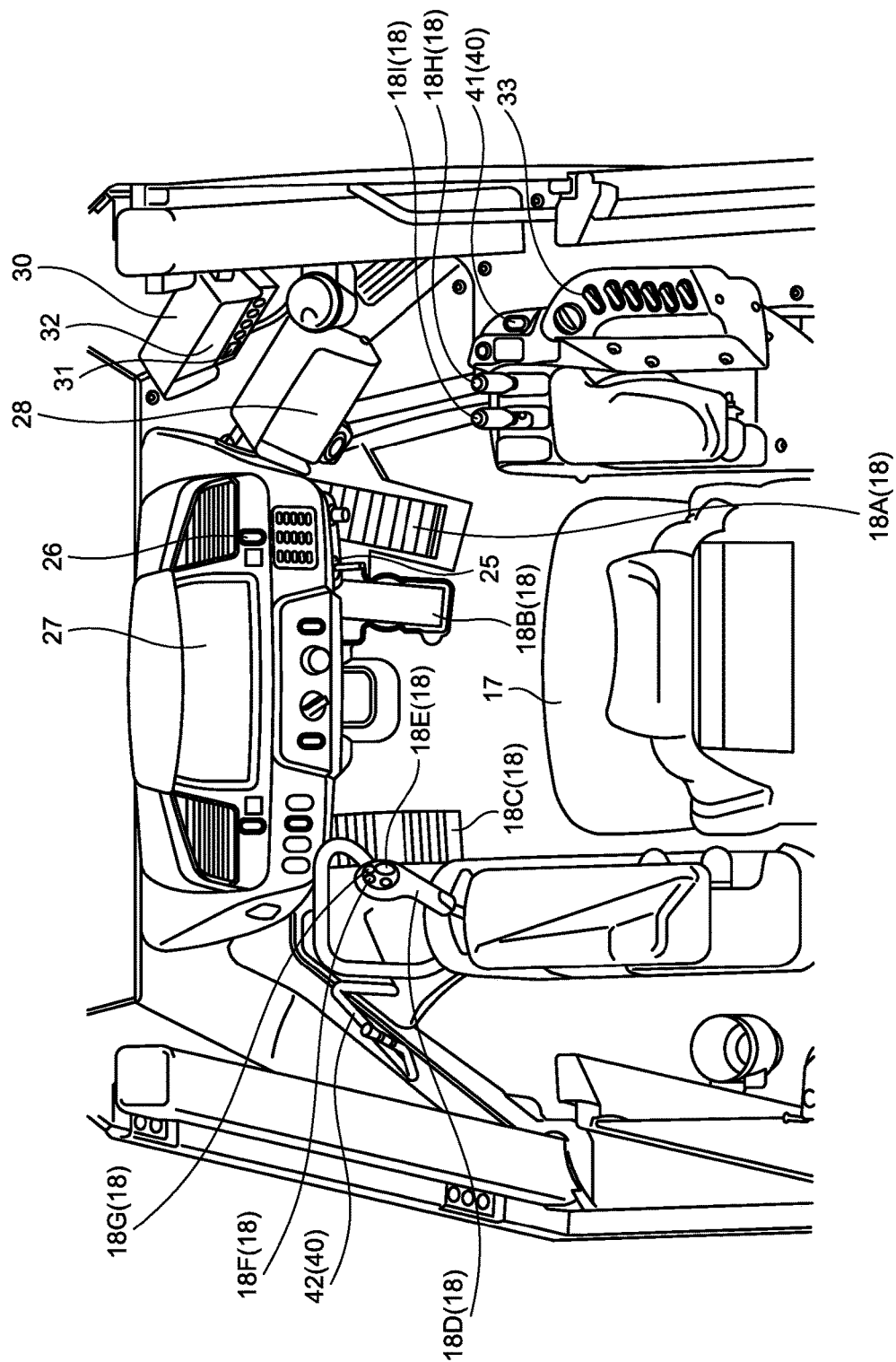
FIG. 3 is a diagram schematically illustrating an example of a driving room according to the first embodiment.

FIG. 3 is a diagram schematically illustrating an example of the driving room 3R according to the embodiment. FIG. 3 schematically illustrates a part of the driving room 3R when the front side is viewed from the rear part of the driving room 3R. As illustrated in FIG. 3, the driving room 3R is provided with the driver seat 17 on which the passenger sits and a driving operation device 18 which is operated by the passenger. The driving operation device 18 includes an accelerator pedal 18A, a right brake pedal 18B, a left brake pedal 18C, a steering lever 18D, a forward/reverse changeover switch 18E, a shift-down switch 18F, a shift-up switch 18G, a boom operation lever 18H, and a bucket operation lever 18I. The passenger can drive, brake, and swing the traveling device 4, change the forward/reverse traveling state, adjust the traveling speed, and operate the working machine 10 by operating the driving operation device 18.

The accelerator pedal 18A is operated to drive the traveling device 4. The right brake pedal 18B and the left brake pedal 18C are operated to brake the traveling device 4. The accelerator pedal 18A, the right brake pedal 18B, and the left brake pedal 18C are disposed at a position located at the front side of the driver seat 17 and the lower side of the driver seat 17 and are operated by a foot of the passenger sitting on the driver seat 17.

The steering lever 18D is operated to swing the wheel loader 1. When the steering lever 18D is operated, the steering cylinder of the articulation mechanism 9 is operated to bend the front vehicle body part 2F with respect to the rear vehicle body part 2R. The steering lever 18D is disposed at a position located at the left side of the driver seat 17 and the front side of the driver seat 17 and is operated by a left hand of the passenger sitting on the driver seat 17.

The forward/reverse changeover switch 18E is operated to switch the forward and reverse traveling state of the traveling device 4. The shift-down switch 18F and the shift-up switch 18G are operated to switch a gear ratio of a transmission of the traveling device 4. The forward/reverse changeover switch 18E, the shift-down switch 18F, and the shift-up switch 18G are disposed at the steering lever 18D and are operated by a left hand of the passenger sitting on the driver seat 17.

The boom operation lever 18H is operated to operate the boom 11 of the working machine 10. The bucket operation lever 18I is operated to operate the bucket 12 of the working machine 10. The boom operation lever 18H and the bucket operation lever 18I are disposed at a position located at the right side of the driver seat 17 and the front side of the driver seat 17 and are operated by a right hand of the passenger sitting on the driver seat 17.

Further, the driving room 3R is provided with a start switch 25 and a parking brake switch 26.

The start switch 25 is operated to start an engine of the wheel loader 1. When the start switch 25 is operated after a key is inserted into a keyhole provided in the driving room 3R to become a key-on state so that a power source 70 of the wheel loader 1 is activated, the engine of the wheel loader 1 is started.

The parking brake switch 26 is operated to operate the parking brake of the wheel loader 1.

Further, the driving room 3R is provided with a monitor device 27 and a rear view monitoring device 28. The monitor device 27 is disposed at the front side of the driver seat 17. The rear view monitoring device 28 is disposed at a position located at the right side of the driver seat 17 and the front side of the driver seat 17.

Further, the driving room 3R is provided with a monitoring monitor device 30. The monitoring monitor device 30 is disposed at a position located at the right side of the driver seat 17 and the front side of the driver seat 17. The monitoring monitor device 30 includes a warning device 31 which outputs a warning sound and a display device 32 which displays display data.

The warning device 31 outputs a warning sound based on the detection data of the object detection device 20. In a case where an obstacle existing in the periphery of the wheel loader 1 is detected by the object detection device 20, the warning device 31 outputs a warning sound. The warning device 31 includes a buzzer device capable of outputting a warning sound. In addition, the warning device 31 may include a light emitting device such as a lamp instead of the buzzer device. Alternatively, the warning device 31 may include both the buzzer device and the light emitting device.

The display device 32 displays display data generated based on the detection data of the object detection device 20. The display device 32 displays image data in the periphery of the wheel loader 1 acquired by the camera 21. When an obstacle exists in the periphery of the wheel loader 1, the display device 32 displays obstacle position data detected by the non-contact sensor 22. The display device 32 includes a flat panel display such as a liquid crystal display (LCD) or an organic electroluminescence display (OELD).

Further, the driving room 3R is provided with a cancel operation device 33 which stops an output of the warning sound from the warning device 31. The cancel operation device 33 is provided at the right side of the driver seat 17. When the cancel operation device 33 is operated, the output of the warning sound is stopped. There is a case where the passenger needs to stop the output of the warning sound from the warning device 31. The passenger can stop the output of the warning sound by operating the cancel operation device 33.

The cancel operation device 33 includes, for example, a rocker switch or a push button. In the description below, the cancel operation device 33 will be appropriately referred to as a cancel switch 33.

In addition, the display device 32 may include a touch panel and the touch panel may have a function of the cancel operation device 33.

Further, the driving room 3R is provided with a lock operation device 40 which is operated by the passenger to limit the driving of the driving mechanism of the wheel loader 1. The driving mechanism of the wheel loader 1 includes the working machine 10 and the traveling device 4. The lock operation device 40 includes a working machine locking switch 41 which is operated by the passenger to limit the driving of the working machine 10 and a steering locking lever 42 which is operated by the passenger to limit the driving of the traveling device 4. In the embodiment, a case of limiting the driving of the traveling device 4 includes a case of locking the traveling device 4 so that the traveling device cannot be operated. A case of locking the traveling device 4 so that the traveling device cannot be operated includes a case of prohibiting the forward and backward traveling operation of the wheel loader 1 and a case of prohibiting the swinging operation of the wheel loader 1 in which the steering cylinder of the articulation mechanism 9 is operated and the front vehicle body part 2F is bent with respect to the rear vehicle body part 2R. In addition, a case of limiting the driving of the traveling device 4 may include a case of prohibiting any one of the forward and backward traveling operation and the swinging operation.

The working machine locking switch 41 includes, for example, a rocker switch and is disposed at a position located at the front side of the driver seat 17 and the right side of the driver seat 17. In addition, an operation lever may be provided as the working machine locking switch 41. The working machine locking switch 41 is provided in the vicinity of the boom operation lever 18H and the bucket operation lever 18I for operating the working machine 10. The working machine locking switch 41 can be switched between a lock position and a free position. When the working machine locking switch 41 is operated to be disposed at the lock position, a lock state is set in which the operation of the boom operation lever 18H and the bucket operation lever 18I is locked and the driving of the working machine 10 is limited. In the lock state, the working machine 10 cannot be operated. When the working machine locking switch 41 is operated to be disposed at the free position, a free state is set in which the locking of the operation of the boom operation lever 18H and the bucket operation lever 18I is released and the limiting of the driving of the working machine 10 is released. In the free state, the working machine 10 can be operated.

The steering locking lever 42 is disposed at a position located at the front side of the driver seat 17 and the left side of the driver seat 17. The steering locking lever 42 is disposed in the vicinity of the steering lever 18D for operating the traveling device 4. The steering locking lever 42 can be switched between a lock position L2 and a free position F2. When the steering locking lever 42 is operated to be disposed at the lock position L2, a lock state is set in which the steering lever 18D is locked and the driving of the traveling device 4 is limited. In the lock state, the wheel loader 1 cannot travel and swing. When the steering locking lever 42 is operated to be disposed at the free position F2, a free state is set in which the locking of the steering lever 18D is released and the limiting of the driving of the traveling device 4 is released. In the free state, the wheel loader 1 can travel and swing.

[Steering Locking Lever]

Figure 4:
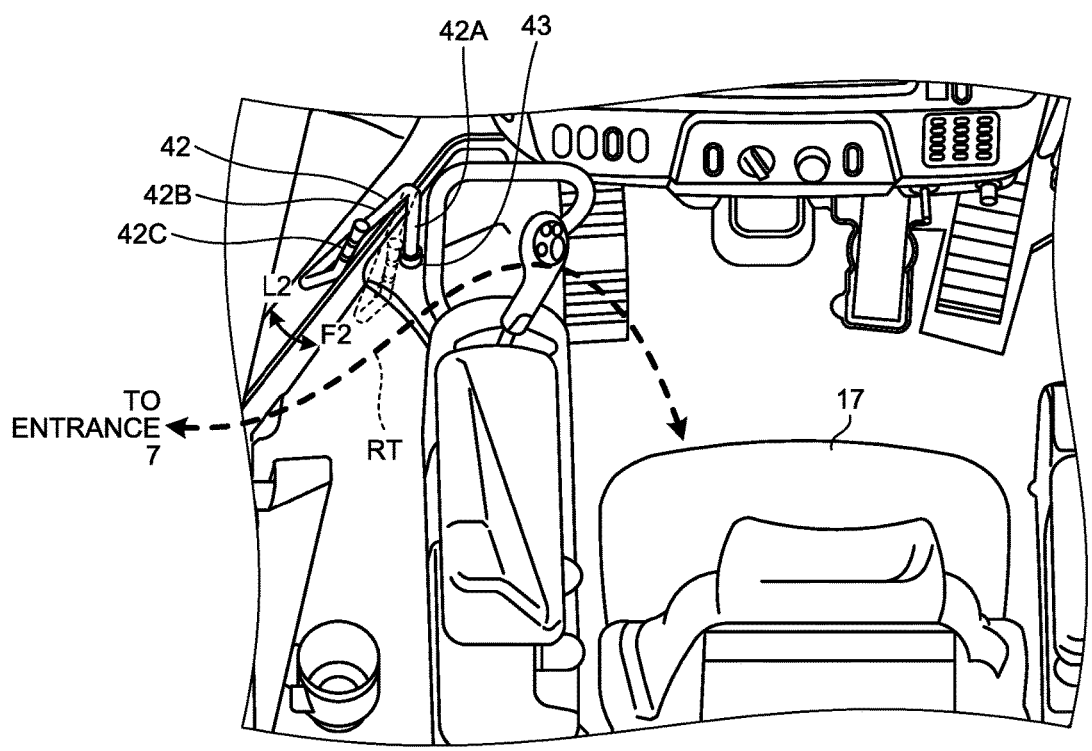
FIG. 4 is a diagram schematically illustrating an example of a lock operation device according to the first embodiment.

FIG. 4 is a diagram schematically illustrating an example of the steering locking lever 42 according to the embodiment. As illustrated in FIGS. 3 and 4, the steering locking lever 42 is provided in a boarding passage RT of the driving room 3R through which the passenger passes in a case where the passenger gets on the driving room 3R.

The boarding passage RT of the driving room 3R is a path which connects the entrance 7 and the driver seat 17 in the driving room 3R. The passenger is movable through the boarding passage RT. In a case where the passenger existing outside the driving room 3R gets on the driving room 3R, the passenger enters the driving room 3R through the entrance 7 provided at the left side of the cab 3. The passenger who enters the driving room 3R moves to the driver seat 17 through the boarding passage RT of the driving room 3R and sits on the driver seat 17. In a case where the passenger sitting on the driver seat 17 leaves from the driving room 3R, the passenger stands up from the driver seat 17, moves to the entrance 7 through the boarding passage RT of the driving room 3R, and leaves to the outside of the driving room 3R.

The steering locking lever 42 is provided in the boarding passage RT of the driving room 3R connecting the entrance 7 and the driver seat 17. The steering locking lever 42 is rotatably supported on a floor surface of the driving room 3R.

The steering locking lever 42 is a bar-shaped member. The steering locking lever 42 includes a support pillar portion 42A which is supported on the floor surface, an arm portion 42B which is connected to an upper end portion of the support pillar portion 42A, and a handle portion 42C which is connected to a front end portion of the arm portion 42B. The support pillar portion 42A is formed upright on the floor surface to extend in the vertical direction. The support pillar portion 42A is rotatably supported on the floor surface of the driving room 3R. The rotation axis of the support pillar portion 42A is substantially orthogonal to the floor surface of the driving room 3R. A base end portion of the arm portion 42B is connected to the upper end portion of the support pillar portion 42A. The arm portion 42B extends radially outward of the rotation axis of the support pillar portion 41A. The arm portion 42B is formed upright from a portion connected to the support pillar portion 42A toward a portion connected to the handle portion 42C. That is, the arm portion 42B extends obliquely upward. The handle portion 42C extends upward from the front end portion of the arm portion 42B. The passenger holds the handle portion 42C and operates the steering locking lever 42 to rotate the steering locking lever 42 about the rotation axis of the support portion 42A.

As illustrated in FIG. 4, the steering locking lever 42 is rotatable to move between the lock position L2 and the free position F2. In FIG. 4, the steering locking lever 42 located at the lock position L2 is indicated by a solid line and the steering locking lever 42 located at the free position F2 is indicated by a dashed line. When the steering locking lever 42 is disposed at the lock position L2, the arm portion 42B is retracted from the boarding passage RT and the boarding passage RT is opened. When the steering locking lever 42 is disposed at the free position F2, the arm portion 42B is disposed in the boarding passage RT to block the passage of the passenger and the boarding passage RT is closed.

That is, when the steering locking lever 42 is disposed at the lock position L2, the boarding passage RT is opened so that a passage allowing state is set in which the passenger can pass through the boarding passage RT. When the steering locking lever 42 is disposed at the free position F2, the boarding passage RT is closed so that a passage prohibiting state is set in which the passenger cannot pass through the boarding passage RT or cannot easily pass through the boarding passage.

In this way, the steering locking lever 42 is operated by the passenger so that the boarding passage RT changes from one state of the passage allowing state and the passage prohibiting state to the other state thereof.

In a case where the passenger sits on the driver seat 17 and operates the wheel loader 1, the passenger disposes the working machine locking switch 41 at the free position and disposes the steering locking lever 42 at the free position F2. Accordingly, a free state is set in which the driving mechanism of the wheel loader 1 including the traveling device 4 and the working machine 10 can be operated. The passenger can perform an actual work or a maintenance work by operating the driving operation device 18.

In a case where the passenger leaves from the driving room 3R, the passenger causes the bucket 12 of the working machine 10 to contact a ground and operates the parking brake switch 26 to operate the parking brake. Further, the passenger disposes the working machine locking switch 41 at the lock position and disposes the steering locking lever 42 at the lock position L2. When the working machine locking switch 41 is disposed at the lock position, a lock state is set in which the working machine 10 cannot be operated. When the steering locking lever 42 is disposed at the lock position L2, a lock state is set in which the traveling device 4 cannot be operated. Accordingly, in a case where the passenger does not exist in the driving room 3R, it is possible to suppress the movement of the working machine 10 and the traveling device 4. Further, when the steering locking lever 42 is disposed at the lock position L2, the passenger sitting on the driver seat 17 can smoothly leave to the outside of the driving room 3R through the boarding passage RT.

In a case where the passenger gets on the driving room 3R, the passenger moves from the entrance 7 to the driver seat 17 through the boarding passage RT. Since the steering locking lever 42 is disposed at the lock position L2, the passenger cannot smoothly move to the driver seat 17 through the boarding passage RT. After the passenger sits on the driver seat 17, the passenger disposes the working machine locking switch 41 at the free position and disposes the steering locking lever 42 at the free position F2. Further, the passenger turns off the parking brake switch 26 to cancel the operation of the parking brake. Accordingly, the driving mechanism including the traveling device 4 and the working machine 10 can move in a free state. Further, the passenger operates the power source 70 and the start switch 25 in a key-on state. Accordingly, the engine of the wheel loader 1 is activated. The passenger can perform an actual work or a maintenance work by operating the driving operation device 18.

The wheel loader 1 includes a boarding state detection device 43 which detects a passenger boarding state in the driving room 3R. The passenger boarding state in the driving room 3R includes a state where the passenger exists or does not exist in the driving room 3R. Further, the passenger boarding state in the driving room 3R includes a state where the passenger sits or does not sit on the driver seat 17.

The passenger boarding state in the driving room 3R includes the operation state of the steering locking lever 42. The boarding state detection device 43 detects the operation state of the steering locking lever 42. In the embodiment, the boarding state detection device 43 includes a pressure sensor which is disposed in a hydraulic circuit provided with a valve operated by the steering locking lever 42.

The valve is connected to the lower end portion of the support portion 42A of the steering locking lever 42. The valve is provided in the hydraulic circuit. The hydraulic circuit circulates hydraulic oil for driving the traveling device 4. The valve can open and close the hydraulic circuit. The pressure sensor is disposed at the downstream side of the valve in the hydraulic circuit. When the steering locking lever 42 is switched between the lock position L2 and the free position F2, the valve is operated so that the hydraulic circuit is opened or closed. When the hydraulic circuit is opened or closed by the valve, a pressure at the downstream side of the valve changes. The pressure sensor which is provided at the downstream side of the valve can detect a state where the hydraulic circuit is opened so that the hydraulic oil flows and a state where the hydraulic circuit is closed so that the hydraulic oil does not flow. Based on the detection data of the pressure sensor, the operation state of the steering locking lever 42 is detected. In the description below, the boarding state detection device 43 will be appropriately referred to as the lever sensor 43.

In addition, a detection device capable of directly detecting the position of the steering locking lever 42 such as a contact switch or an encoder may be used as the boarding state detection device 43 which detects the operation state of the steering locking lever 42.

The operation state of the steering locking lever 42 includes the passage prohibiting state where the steering locking lever 42 is disposed at the free position F2 and the passage allowing state where the steering locking lever is disposed at the lock position L2. The lever sensor 43 detects a state where the steering locking lever 42 is disposed at anyone of the free position F2 and the lock position L2. As described above, the steering locking lever 42 is disposed at the free position F2 in a case where the passenger existing in the driving room 3R drives the wheel loader 1. The steering locking lever 42 is disposed at the lock position L2 in a case where the passenger leaves from the driving room 3R. For that reason, the passage prohibiting state where the steering locking lever 42 is disposed at the free position F2 can be considered as a state where the passenger exists in the driving room 3R. The passage allowing state where the steering locking lever 42 is disposed at the lock position L2 can be considered as a state where the passenger does not exist in the driving room 3R. Thus, the lever sensor 43 can detect whether the passenger exists in the driving room 3R by detecting whether the steering locking lever 42 is disposed at the free position F2.

In the description below, the detection data output from the lever sensor 43 in the passage prohibiting state where the steering locking lever 42 is disposed at the free position F2 will be appropriately referred to as the boarding detection data and the detection data output from the lever sensor 43 in the passage allowing state where the steering locking lever 42 is disposed at the lock position L2 will be appropriately referred to as the non-boarding detection data. In the embodiment, the detection data of the boarding state detection device 43 detecting the passenger boarding state in the driving room 3R is the detection data output from the lever sensor 43.

[Control Device]

Figure 5:
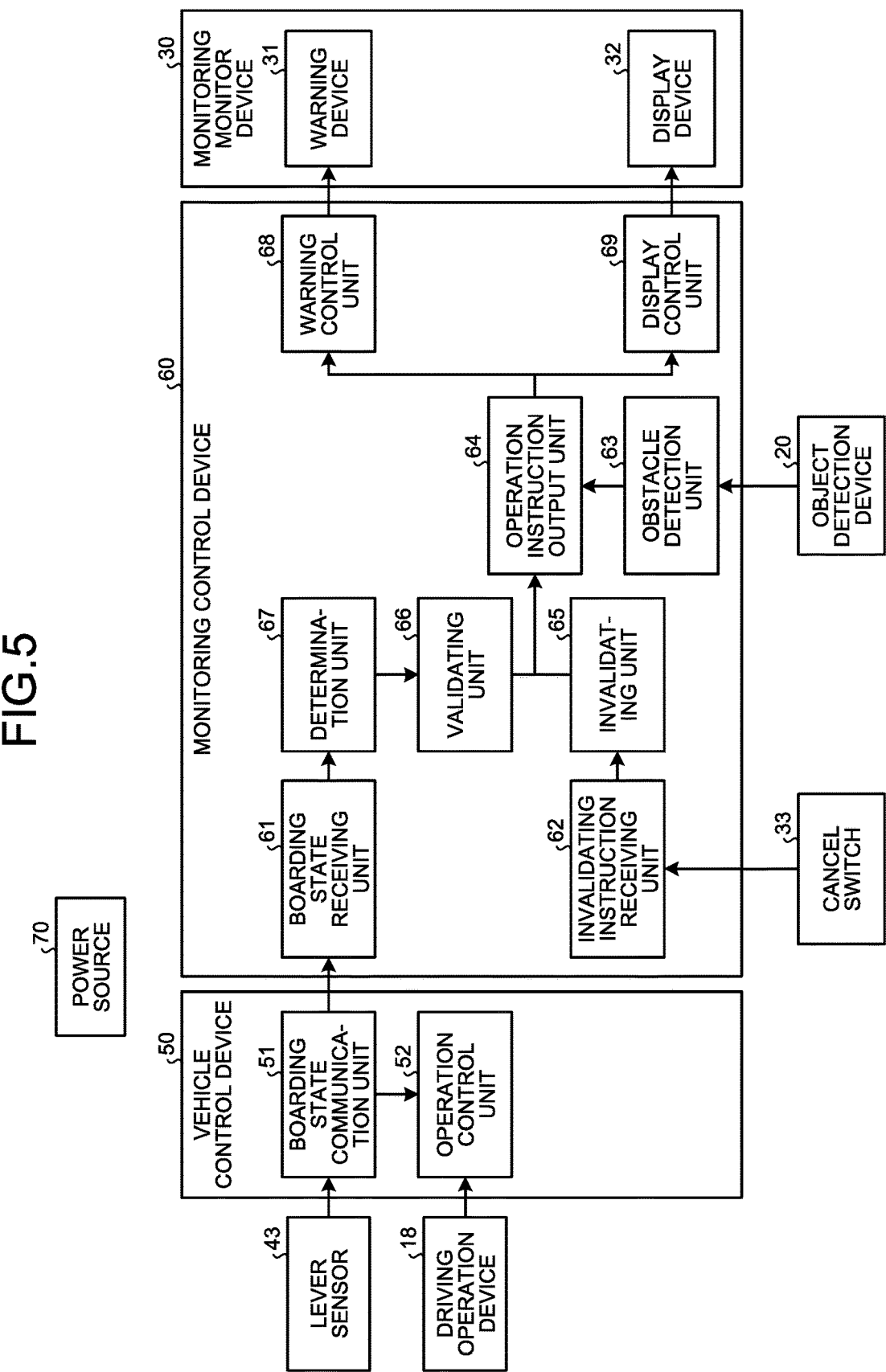
FIG. 5 is a functional block diagram illustrating an example of a periphery monitoring system according to the first embodiment.

FIG. 5 is a functional block diagram illustrating an example of the periphery monitoring system 100 according to the embodiment. As illustrated in FIG. 5, a vehicle control device 50 and a monitoring control device 60 are mounted on the wheel loader 1. The vehicle control device 50 controls the movable mechanism of the wheel loader 1 including the traveling device 4 and the working machine 10. The periphery monitoring system 100 includes the monitoring control device 60. The monitoring control device 60 controls the periphery monitoring system 100.

The vehicle control device 50 is connected to each of the lever sensor 43 and the driving operation device 18. The monitoring control device 60 is connected to each of the vehicle control device 50, the object detection device 20, the monitoring monitor device 30, and the cancel switch 33.

An electronic device of the wheel loader 1 including the vehicle control device 50, the monitoring control device 60, the lever sensor 43, the driving operation device 18, the cancel switch 33, the object detection device 20, and the monitoring monitor device 30 is operated based on the power supplied from the power source 70 mounted on the wheel loader 1. When the passenger sets the key-on state, the power source 70 is operated. When the passenger sets the key-off state, the operation of the power source 70 is stopped. In the key-on state, the electronic device of the wheel loader 1 is operated by the power supplied from the power source 70. In the key-off state, the operation of the electronic device of the wheel loader 1 is stopped.

The vehicle control device 50 includes a boarding state communication unit 51 and an operation control unit 52.

The boarding state communication unit 51 receives the detection data of the lever sensor 43 representing the passenger boarding state in the driving room 3R from the lever sensor 43 and transmits the detection data to the monitoring control device 60. Further, the boarding state communication unit 51 outputs the detection data of the lever sensor 43 to the operation control unit 52.

The operation control unit 52 receives an operation signal from the driving operation device 18. In a case where the driving operation device 18 is operated by the passenger, based on an operation amount of the driving operation device 18, an operation signal is output from the driving operation device 18. The operation control unit 52 outputs an instruction signal for controlling the traveling device 4 and the working machine 10 based on the operation signal from the driving operation device 18. In a case where the lever sensor 43 detects a state where the steering locking lever 42 is disposed at the lock position L2, the operation control unit 52 outputs an instruction signal for limiting the driving of the traveling device 4 based on the non-boarding detection data of the lever sensor 43.

The monitoring control device 60 includes a boarding state receiving unit 61, an invalidating instruction receiving unit 62, an obstacle detection unit 63, an operation instruction output unit 64, an invalidating unit 65, a validating unit 66, a determination unit 67, a warning control unit 68, and a display control unit 69.

The boarding state receiving unit 61 receives the detection data of the lever sensor 43 from the boarding state communication unit 51.

The invalidating instruction receiving unit 62 receives an invalidating instruction output from the cancel switch 33. When the cancel switch 33 is operated, an invalidating instruction for stopping the output of the warning sound is output from the cancel switch 33. The invalidating instruction receiving unit 62 receives the invalidating instruction output from the cancel switch 33.

The obstacle detection unit 63 receives the detection data of the object detection device 20. In a case where an obstacle exists in the periphery of the wheel loader 1 and the object detection device 20 detects the obstacle, the object detection device 20 outputs detection data representing a state where the obstacle exists. The obstacle detection unit 63 receives the detection data representing a state where the obstacle exists in the periphery of the wheel loader 1 from the object detection device 20.

The operation instruction output unit 64 receives the detection data of the object detection device 20 from the obstacle detection unit 63. The operation instruction output unit 64 outputs an operation instruction to the warning device 31 based on the detection data of the object detection device 20. In a case where the detection data representing a state where the obstacle exists in the periphery of the wheel loader 1 is received, the operation instruction output unit 64 outputs an operation instruction to the warning device 31 to output a warning sound. When the warning sound is output, the passenger can recognize a state where the obstacle exists in the periphery of the wheel loader 1.

The invalidating unit 65 receives an invalidating instruction from the invalidating instruction receiving unit 62. The invalidating unit 65 invalidates the operation instruction of the operation instruction output unit 64 based on the invalidating instruction output from the cancel switch 33.

A case of invalidating the operation instruction includes at least one of a case where the operation instruction becomes invalid, a case where the output of the operation instruction to the warning device 31 is stopped, and a case where the invalidating instruction is output to the warning device 31 so that the warning sound cannot be output. When the operation instruction becomes invalid, the warning device 31 cannot output the warning sound. The warning device 31 stops the output of the warning sound. When the operation instruction becomes invalid, the warning device 31 does not output the warning sound even when the object detection device 20 detects the obstacle.

The validating unit 66 receives the detection data of the lever sensor 43 from the boarding state receiving unit 61. The validating unit 66 validates the invalidated operation instruction based on the detection data of the lever sensor 43. In a case where the steering locking lever 42 is operated in a specific operation state, the validating unit 66 validates the invalidated operation instruction based on the detection data of the lever sensor 43.

A case of validating the operation instruction includes at least one of a case of validating the invalidated operation instruction, a case of canceling the stop of the output of the operation instruction to the warning device 31, and a case of outputting a valid instruction to the warning device 31 so that a warning can be output therefrom. When the operation instruction is validated, the warning device 31 can output the warning sound. In a case where the object detection device 20 detects an obstacle, the warning device 31 outputs a warning sound.

The determination unit 67 determines whether the passenger gets on the driving room 3R based on the detection data of the lever sensor 43. The validating unit 66 validates the invalidated operation instruction based on the determination of the determination unit 67.

The warning control unit 68 outputs an instruction signal for controlling the warning device 31. In a case where the operation instruction of the operation instruction output unit 64 is valid, the warning control unit 68 outputs a valid instruction to the warning device 31. When the valid instruction is received, the warning device 31 can output a warning sound. In a case where the object detection device 20 detects an obstacle, the warning device 31 outputs the warning sound. In a case where the operation instruction of the operation instruction output unit 64 is invalid, the warning control unit 68 outputs an invalidating instruction to the warning device 31. When the invalidating instruction is received, the warning device 31 cannot output the warning sound. Even when the object detection device 20 detects the obstacle, the warning control unit 68 does not output the warning sound from the warning device 31.

The display control unit 69 outputs an instruction signal for controlling the display device 32. In a case where the operation instruction of the operation instruction output unit 64 is valid, the display control unit 69 displays display data representing a state where the operation instruction is valid on the display device 32. In a case where the operation instruction of the operation instruction output unit 64 is invalid, the display control unit 69 displays display data representing a state where the operation instruction is invalid on the display device 32.

[Periphery Monitoring Method]

Figure 6:
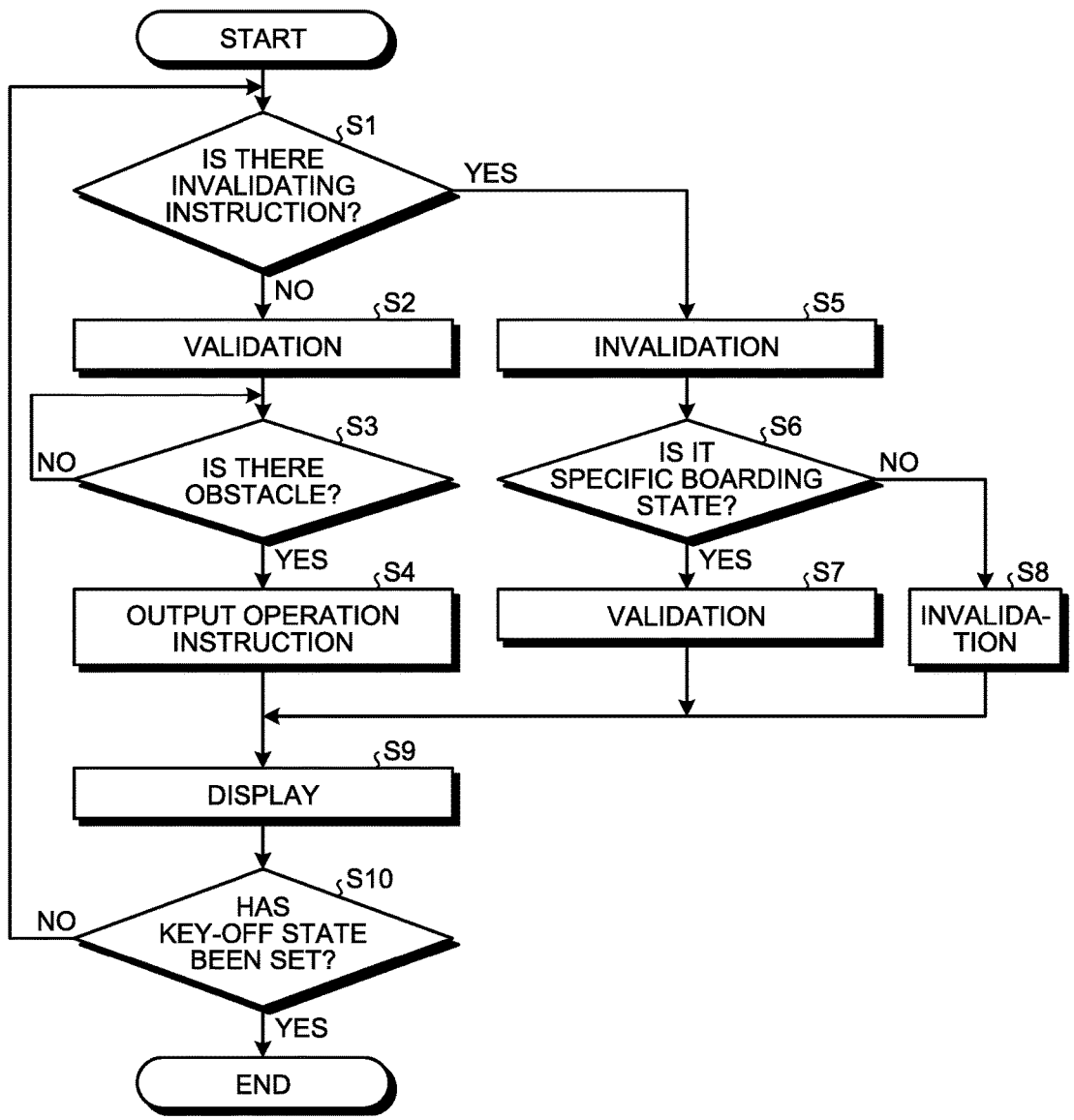
FIG. 6 is a flowchart illustrating an example of a periphery monitoring process according to the first embodiment.

FIG. 6 is a flowchart illustrating an example of the periphery monitoring process according to the periphery monitoring method of the embodiment. When the passenger sets the key-on state so that the power source 70 is activated, the periphery monitoring process is started. In the key-on state, the operation instruction output from the operation instruction output unit 64 is valid and the warning device 31 can output the warning sound.

After the key-on state is set, the invalidating unit 65 determines whether the invalidating instruction is output from the cancel switch 33 (step S1).

In step S1, when it is determined that the invalidating instruction is not output (step S1: No), the operation instruction output from the operation instruction output unit 64 is kept in a valid state (step S2). That is, a state where the warning device 31 can output a warning is kept.

The obstacle detection unit 63 determines whether an obstacle exists in the periphery of the wheel loader 1 based on the detection data of the object detection device 20 (step S3).

In step S3, when it is determined that the obstacle does not exist (step S3: No), the state of the operation instruction output unit 64 is kept.

In step S3, when it is determined that the obstacle exists (step S3: Yes), the operation instruction output unit 64 outputs an operation instruction to the warning device 31 through the warning control unit 68 (step S4). The warning control unit 68 transmits a valid instruction to the warning device 31 based on the operation instruction output from the operation instruction output unit 64 and outputs a warning sound.

In step S1, when it is determined that a invalidating instruction is output (step S1: Yes), the invalidating unit 65 invalidates the operation instruction output from the operation instruction output unit 64 (step S5). Accordingly, the warning device 31 changes from a state where the warning can be output to a state where the warning cannot be output.

The determination unit 67 determines whether the passenger boarding state in the driving room 3R is a specific boarding state based on the detection data of the lever sensor 43 (step S6).

In step S6, when it is determined that a current boarding state is the specific boarding state (step S6: Yes), the validating unit 66 validates the invalidated operation instruction (step S7). Accordingly, the operation instruction output from the operation instruction output unit 64 is validated and the warning device 31 changes from a state where the warning cannot be output to a state where the warning can be output.

In step S6, when it is determined that the current boarding state is not the specific boarding state (step S6: No), the operation instruction output from the operation instruction output unit 64 is invalidated (step S8). That is, a state where the warning device 31 cannot output the warning is kept.

The display control unit 69 displays display data representing a state where the operation instruction is valid or invalid on the display device 32 (step S9).

The determination unit 67 determines whether the key-off state is set (step S10). The monitoring control device 60 performs processes from step S1 to step S10 at a predetermined cycle. In step S10, when it is determined that the key-off state is not set (step S10: No), a routine returns to step S1. In step S10, when it is determined that the key-off state is set (step S10: Yes), the periphery monitoring process ends.

Figure 7:
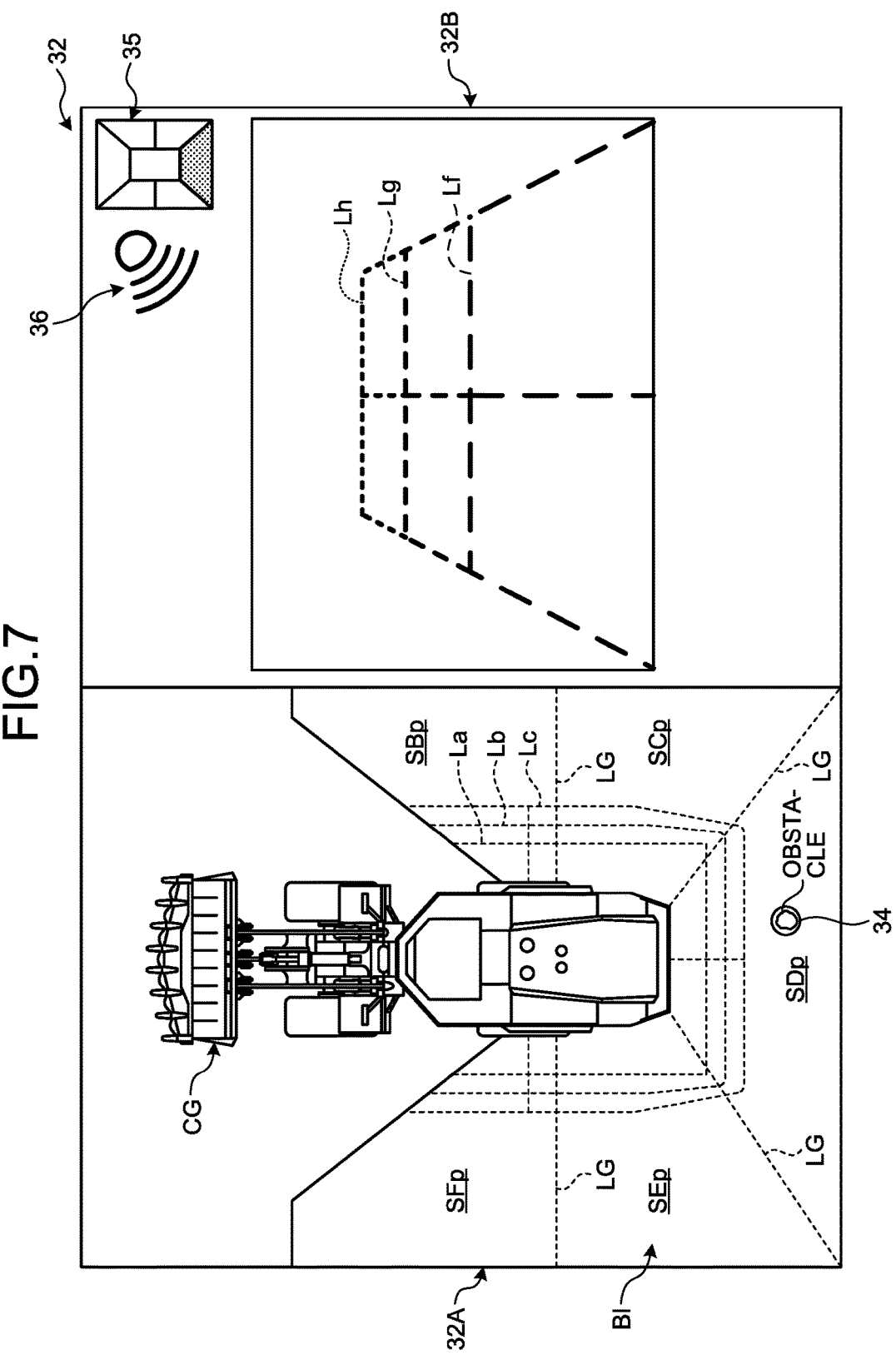
FIG. 7 is a diagram schematically illustrating an example of a display device according to the first embodiment.

FIG. 7 is a diagram schematically illustrating an example of the display device 32 according to the embodiment. As illustrated in FIG. 7, the display control unit 69 displays a character image CG and an bird's eye image BI of the wheel loader 1 on a first area 32A of a display screen of the display device 32 and displays an image representing the rear side of the wheel loader 1 photographed by the camera 21D on a second area 32B of the display screen in the vicinity of the first area 32A. In addition, FIG. 7 illustrates a display example of the display device 32 when the wheel loader 1 travels backward.

The display control unit 69 displays lines LG indicating boundaries of imaging areas SBp, SCp, SDp, SEp, and SFp of the plurality of cameras 21B, 21C, 21D, 21E, and 21F acquiring the image data for generating the bird's eye image BI on the bird's eye image BI in a superimposed state.

Further, the display control unit 69 displays lines La, Lb, and Lc indicating a distance from the outer edge of the wheel loader 1 on the bird's eye image BI in a superimposed state. The outer edge of the wheel loader 1 is a line forming the outer shape of the wheel loader 1 in the plan view in which the wheel loader 1 is viewed from above in a posture in which the wheel loader 1 can travel straight ahead.

Further, the display control unit 69 displays a mark 34 indicating the position of the obstacle detected by the non-contact sensor 22 on the bird's eye image BI in a superimposed state. For example, in a case where an obstacle existing at the rear side of the wheel loader 1 is detected by the non-contact sensor 22, the display control unit 69 displays the mark 34 on the obstacle displayed on the bird's eye image BI based on the obstacle position data. Accordingly, since the existing obstacle is highlighted, the passenger of the wheel loader 1 can promptly recognize the existence and the position of the obstacle.

An indicator 35 indicating an imaging area of the camera 21 displayed on the second area 32B in the imaging areas of the plurality of cameras 21 is displayed on the second area 32B.

Further, an icon 36 which is display data indicating a state where the operation instruction of the operation instruction output unit 64 is valid is displayed on the second area 32B. In a case where the operation instruction is valid, the icon 36 is displayed. In a case where the operation instruction is invalid, the icon 36 is not displayed. Based on whether the icon 36 is displayed, the passenger can recognize a state where the warning device 31 can output the warning sound. In addition, in a case where the operation instruction is not valid, display data representing a state where the operation instruction is invalid may be displayed. An icon of a first pattern may be displayed in a case where the operation instruction is valid and an icon of a second pattern different from the first pattern may be displayed in a case where the operation instruction is invalid.

In a case where the wheel loader 1 travels backward, the display control unit 69 displays lines Lf, Lg, and Lh indicating a distance from the rear end portion of the wheel loader 1 on a photographed image in a superimposed state. The rear end portion of the wheel loader 1 can be set as, for example, a rear end of a rear bumper provided at the rearmost portion of the rear vehicle body part 2R.

Figure 8:
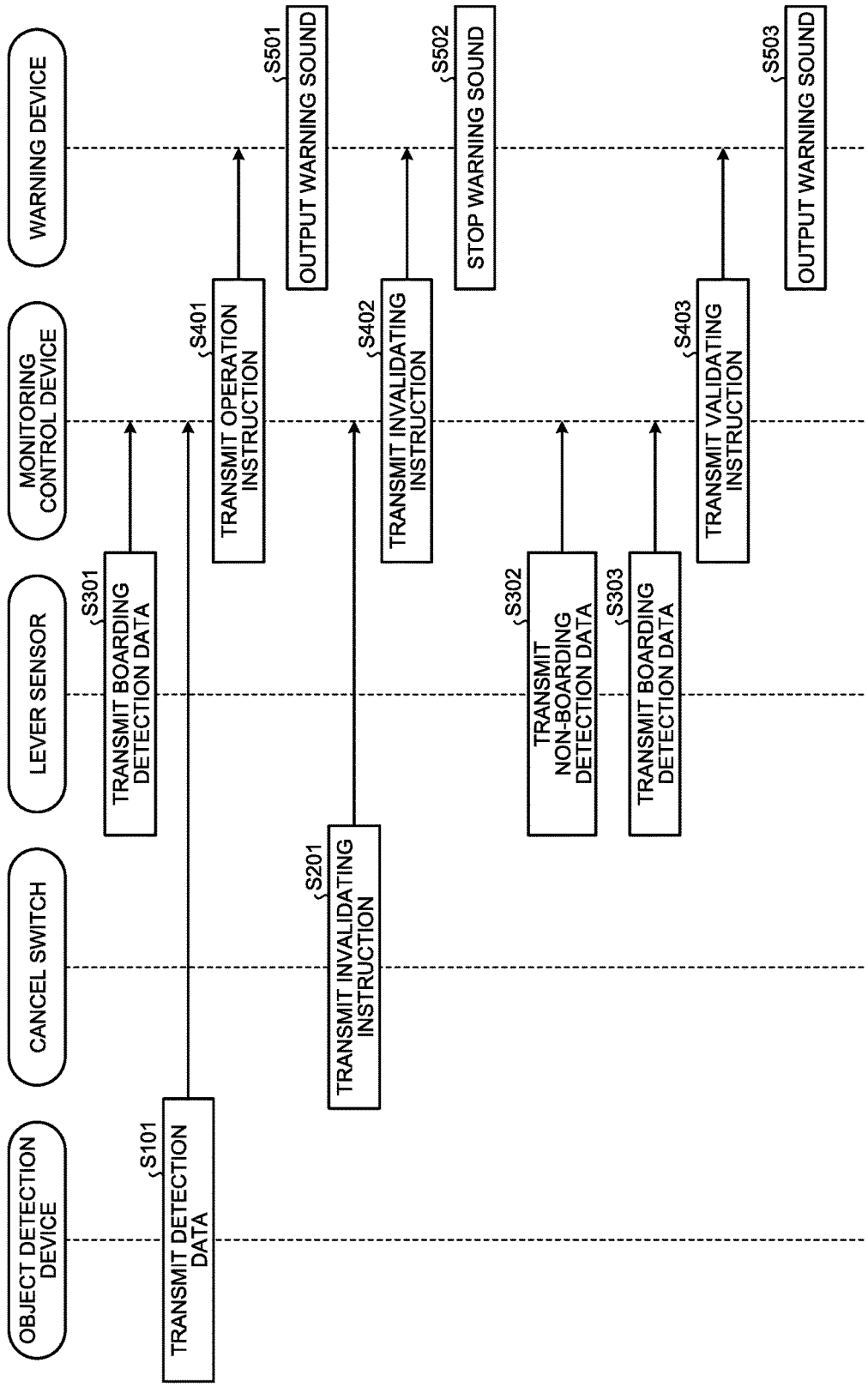
FIG. 8 is a sequence diagram illustrating an example of the periphery monitoring process according to the first embodiment.

FIG. 8 is a sequence diagram illustrating an example of the periphery monitoring process according to the periphery monitoring method of the embodiment. The operator getting on the driving room 3R moves the steering locking lever 42 from the lock position L2 to the free position F2 and moves the working machine locking switch 41 from the lock position to the free position. When the operator sets the key-on state, the power source 70 is activated. The lever sensor 43 transmits boarding detection data representing a state where the operator gets on the driving room 3R to the monitoring control device 60 (step S301).

The determination unit 67 determines that the operator gets on the driving room 3R based on the boarding detection data of the lever sensor 43.

The operator performs an actual work by operating the driving operation device 18. In a case where the object detection device 20 detects an obstacle, the object detection device 20 transmits detection data representing a state where the obstacle exists in the periphery of the wheel loader 1 to the monitoring control device 60 (step S101).

In a state where the cancel switch 33 is not operated after the key-on state is set, the operation instruction output from the operation instruction output unit 64 is valid and the warning device 31 can output a warning. The operation instruction output unit 64 outputs an operation instruction for outputting a warning to the warning device 31. The warning control unit 68 transmits the operation instruction to the warning device 31 (step S401).

The warning device 31 outputs a warning based on the operation instruction transmitted from the warning control unit 68 (step S501). Accordingly, the operator can recognize a state where the obstacle exists in the periphery of the wheel loader 1.

For example, in a case where the wheel loader 1 enters a building or performs a work inside the building, if the object detection device 20 detects a wall surface of the building as an obstacle when an obstacle does not exist in the periphery of the wheel loader 1 or the passenger clearly recognizes a state in the periphery of the wheel loader 1, the warning device 31 outputs an unnecessary warning sound. The unnecessary warning sound is harsh to the operator. There is a case where the operator needs to stop the output of the unnecessary warning sound from the warning device 31. The operator operates the cancel switch 33. An invalidating instruction output from the cancel switch 33 is transmitted to the monitoring control device 60 (step S201).

The invalidating unit 65 invalidates the operation instruction output from the operation instruction output unit 64 based on the invalidating instruction output from the cancel switch 33. The warning control unit 68 transmits an invalidating instruction representing a state where the operation instruction is invalidated to the warning device 31 (step S402).

The warning device 31 changes from a state where the warning sound can be output to a state where the warning sound cannot be output based on the invalidating instruction transmitted from the warning control unit 68. The warning device 31 stops the output of the warning sound (step S502).

For example, for a break or shift work with another operator, the operator getting on the driving room 3R leaves from the driving room 3R. In a case where the operator leaves from the driving room 3R, the operator causes the bucket 12 of the working machine 10 to contact a ground and operates the parking brake switch 26 to operate the parking brake. Further, the operator operates the working machine locking switch 41 from the free position to the lock position and moves the steering locking lever 42 from the free position F2 to the lock position L2. After the operator moves the steering locking lever 42 to the lock position L2, the operator leaves from the driving room 3R through the boarding passage RT. The lever sensor 43 transmits non-boarding detection data representing a state where the steering locking lever 42 is disposed at the lock position L2 to the monitoring control device 60 (step S302).

The determination unit 67 determines that the operator does not get on the driving room 3R based on the non-boarding detection data transmitted from the lever sensor 43.

A next operator gets on the driving room 3R. The operator getting on the driving room 3R moves the steering locking lever 42 from the lock position L2 to the free position F2 and moves the working machine locking switch 41 from the lock position to the free position. The lever sensor 43 transmits boarding detection data representing a state where the steering locking lever 42 is disposed at the free position F2 to the monitoring control device 60 (step S303).

The determination unit 67 determines that the operator gets on the driving room 3R based on the boarding detection data transmitted from the lever sensor 43.

The validating unit 66 validates the invalidated operation instruction based on the boarding detection data transmitted from the lever sensor 43. The warning control unit 68 transmits a valid instruction representing a state where the operation instruction is validated to the warning device 31 (step S403).

The warning device 31 changes from a state where the warning sound cannot be output to a state where the warning sound can be output based on the valid instruction transmitted from the warning control unit 68. When the object detection device 20 detects an obstacle in a case where the warning device 31 changes from a state where the warning sound cannot be output to a state where the warning sound can be output, the warning device 31 outputs the warning sound (step S503).

In this way, in the embodiment, the specific boarding state includes a state where a second passenger gets on the driving room 3R after a first passenger leaves from the driving room 3R. The validating unit 66 validates the invalidated operation instruction in a case where the determination unit 67 determines that the second passenger gets on the driving room 3R after the first passenger leaves from the driving room 3R. That is, the validating unit 66 validates the invalidated operation instruction when the steering locking lever 42 in the passage prohibiting state is operated to the passage allowing state (step S302) and is again operated to the passage prohibiting state (step S303).

In addition, the service man may get on the driving room 3R after the operator leaves from the driving room 3R. That is, the passenger is not limited to the operator.

[Effect]

As described above, according to the embodiment, the operation instruction output from the operation instruction output unit 64 is invalidated based on the invalidating instruction output from the cancel switch 33 provided in the driving room 3R. Accordingly, in a case where an unnecessary warning sound is output from the warning device 31, the passenger can stop the output of the unnecessary warning sound by operating the cancel switch 33.

Further, the validating unit 66 validates the invalidated operation instruction when it is determined that the specific boarding state is set based on the detection data of the lever sensor 43 detecting the passenger boarding state in the driving room 3R. Accordingly, the warning device 31 can output a necessary warning sound.

In a state where the operator first driving the wheel loader 1 operates the cancel switch 33 to stop the output of the warning sound, when the next operator or the service man gets on the wheel loader 1 without recognizing a state where the cancel switch 33 is operated, there is a possibility that a necessary warning sound may not be output even when the wheel loader 1 approaches the obstacle when the next operator or the service man drives the wheel loader 1.

According to the embodiment, in the specific boarding state where the first passenger leaves from the driving room 3R and then the second passenger gets on the driving room 3R, the warning device 31 changes from a state where the warning sound cannot be output to a state where the warning sound can be output. Thus, even when the second passenger gets on the driving room 3R without recognizing a state where the cancel switch 33 is operated by the first passenger, a necessary warning sound is output when the wheel loader 1 approaches the obstacle in a case where the second passenger drives the wheel loader 1.

In this way, according to the embodiment, the output of the unnecessary warning sound is suppressed and the necessary warning sound is output.

Further, according to the embodiment, the invalidated operation instruction is validated based on the operation state of the steering locking lever 42 provided in the boarding passage RT of the driving room 3R. In a case where the first passenger leaves from the driving room 3R and the second passenger gets on the driving room 3R, the steering locking lever 42 is inevitably operated. For that reason, the invalidated operation instruction is reliably validated based on the detection data of the lever sensor 43 detecting the operation state of the steering locking lever 42.

Further, according to the embodiment, the icon 36 which is the display data representing a state where the operation instruction is valid or invalid is displayed on the display device 32 provided in the driving room 3R. Accordingly, the passenger can recognize whether the warning device 31 can output a warning while seeing the display device 32.

Second Embodiment

Figure 9:
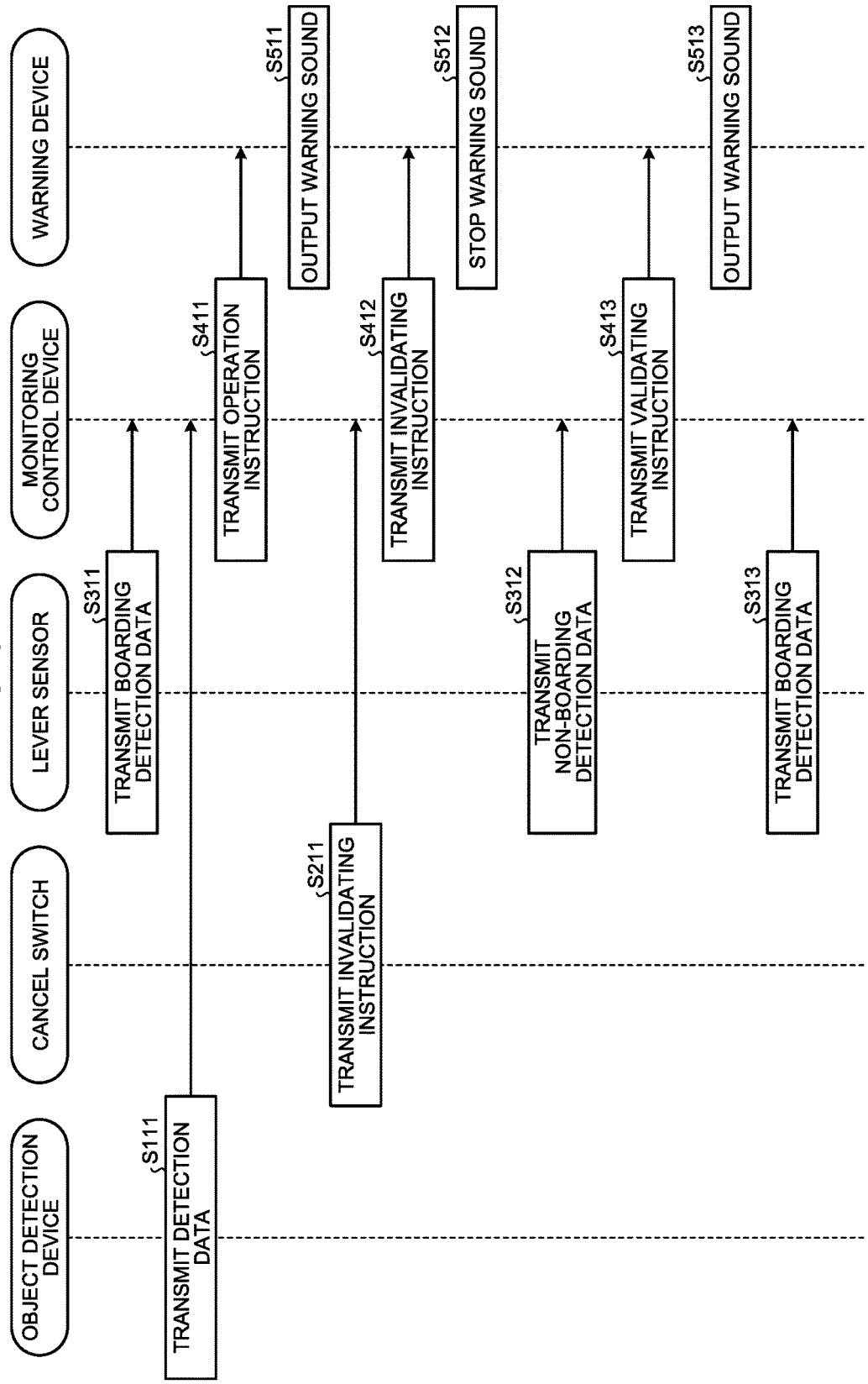
FIG. 9 is a sequence diagram illustrating an example of a periphery monitoring process according to a second embodiment.

FIG. 9 is a sequence diagram illustrating an example of a periphery monitoring process according to a periphery monitoring method of the embodiment. Since steps S111, S211, S311, S411, S412, S511, and S512 illustrated in FIG. 9 have the same processes and procedures as those of steps S101, S201, S301, S401, S402, S501, and S502 described with reference to FIG. 8, a description thereof will be omitted.

The cancel switch 33 is operated by the operator to stop the output of the warning sound from the warning device 31 and the operator getting on the driving room 3R leaves from the driving room 3R for the replacement with another operator. The operator who is going to leave from the driving room 3R moves the working machine locking switch 41 from the free position to the lock position and moves the steering locking lever 42 from the free position F2 to the lock position L2. The lever sensor 43 transmits the non-boarding detection data to the monitoring control device 60 (step S312).

The validating unit 66 validates the invalidated operation instruction based on the non-boarding detection data transmitted from the lever sensor 43. The warning control unit 68 transmits a valid instruction representing a state where the operation instruction is validated to the warning device 31 (step S413). The warning device 31 outputs a warning sound (step S513).

The next operator who gets on the driving room 3R moves the steering locking lever 42 from the lock position L2 to the free position F2 and moves the working machine locking switch 41 from the lock position to the free position. The lever sensor 43 transmits the boarding detection data to the monitoring control device 60 (step S313).

In this way, in the embodiment, the specific boarding state includes a state where the first passenger leaves from the driving room 3R. The validating unit 66 validates the invalidated operation instruction when the determination unit 67 determines that the first passenger has left from the driving room 3R. That is, the validating unit 66 validates the invalidated operation instruction when the steering locking lever 42 in the passage prohibiting state is operated to the passage allowing state (step S312).

As described above, in a case where the first passenger leaves from the driving room 3R, the invalidated operation instruction may be validated based on a time point at which the first passenger leaves from the driving room 3R. Also in the embodiment, the output of the unnecessary warning sound is suppressed and the necessary warning sound is output.

Third Embodiment

Figure 10:
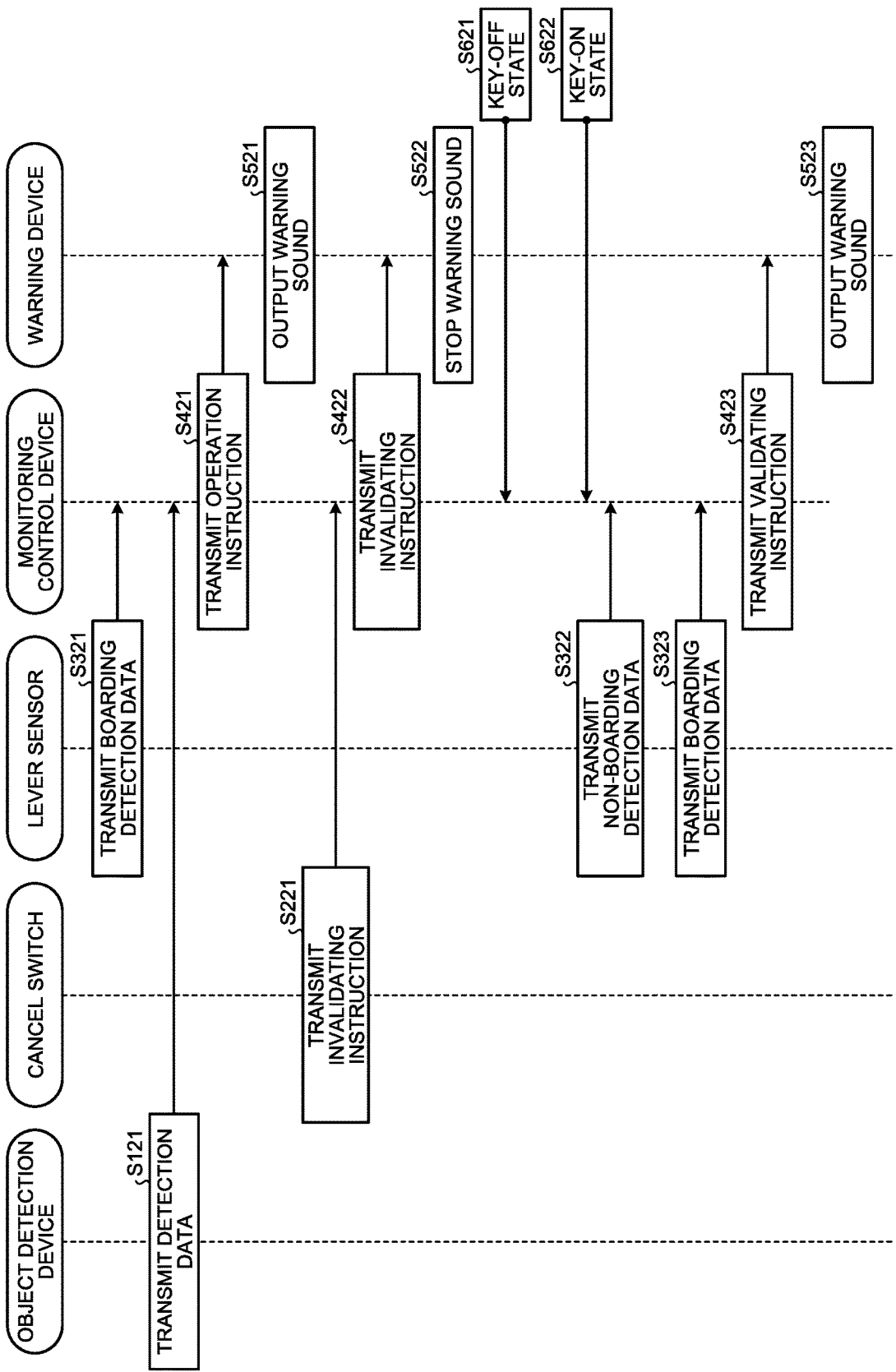
FIG. 10 is a sequence diagram illustrating an example of a periphery monitoring process according to a third embodiment.

FIG. 10 is a sequence diagram illustrating an example of the periphery monitoring process according to the periphery monitoring method of the embodiment. Since steps S121, S221, S321, S421, S422, S521, and S522 illustrated in FIG. 10 have the same processes and procedures as those of steps S101, S201, S301, S401, S402, S501, and S502 described with reference to FIG. 8, a description thereof will be omitted.

The cancel switch 33 is operated by the operator to stop the output of the warning sound from the warning device 31 and the operator getting on the driving room 3R leaves from the driving room 3R for the replacement with another operator. The operator who is going to leave from the driving room 3R moves the working machine locking switch 41 from the free position to the lock position and moves the steering locking lever 42 from the free position F2 to the lock position L2. Further, the operator sets the key-off state when leaving from the driving room 3R (step S621). Since the key-off state is set, the operation of the power source 70 is stopped.

After the previous operator has left from the driving room 3R, the next operator gets on the driving room 3R. The operator getting on the driving room 3R sets the key-on state (step S622). Since the key-on state is set, the power source 70 is operated.

In a case where the steering locking lever 42 is disposed at the lock position L2 in the key-on state, the lever sensor 43 transmits the non-boarding detection data to the monitoring control device 60 (step S322).

The operator moves the steering locking lever 42 from the lock position L2 to the free position F2 and moves the working machine locking switch 41 from the lock position to the free position. The lever sensor 43 transmits the boarding detection data to the monitoring control device 60 (step S323).

The validating unit 66 validates the invalidated operation instruction based on the detection data transmitted from the lever sensor 43. The validating unit 66 validates the invalidated operation instruction in a case where the key-on state is set and the boarding detection data representing a state where the operator gets on the driving room 3R is transmitted from the lever sensor 43. The warning control unit 68 transmits a valid instruction representing a state where the operation instruction is validated to the warning device 31 (step S423). The warning device 31 outputs a warning sound (step S523).

In this way, in the embodiment, the specific boarding state includes a state where the operation instruction is invalidated in the key-on state, the first passenger leaves from the driving room 3R in the key-off state, and the second passenger gets on the driving room 3R to set the key-on state again.

In a case where the operation instruction is invalidated in the key-on state (step S422), the first passenger leaves from the driving room 3R in the key-off state (step S621), and the second passenger gets on the driving room 3R to set the key-on state again (step S622), the validating unit 66 validates the invalidated operation instruction based on the detection data of the lever sensor 43. In the embodiment, the validating unit 66 validates the invalidated operation instruction in a case where the second passenger gets on the driving room 3R to set the key-on state again and the boarding detection data representing a state where the second passenger gets on the driving room 3R is transmitted from the lever sensor 43. That is, in a case where the non-boarding detection data representing a state where the steering locking lever 42 is not disposed at the free position F2 is transmitted from the lever sensor 43 even when the second passenger gets on the driving room 3R to set the key-on state again, the validating unit 66 keeps a state where the operation instruction is invalid without validating the invalidated operation instruction.

As described above, even when the key-on state is set again, a state where the operation instruction is invalid may be kept until the boarding detection data is output from the lever sensor 43 and the operation instruction may be validated after the boarding detection data is output from the lever sensor 43. Also in the embodiment, the output of the unnecessary warning sound is suppressed and the necessary warning sound is output.

Fourth Embodiment

Figure 11:
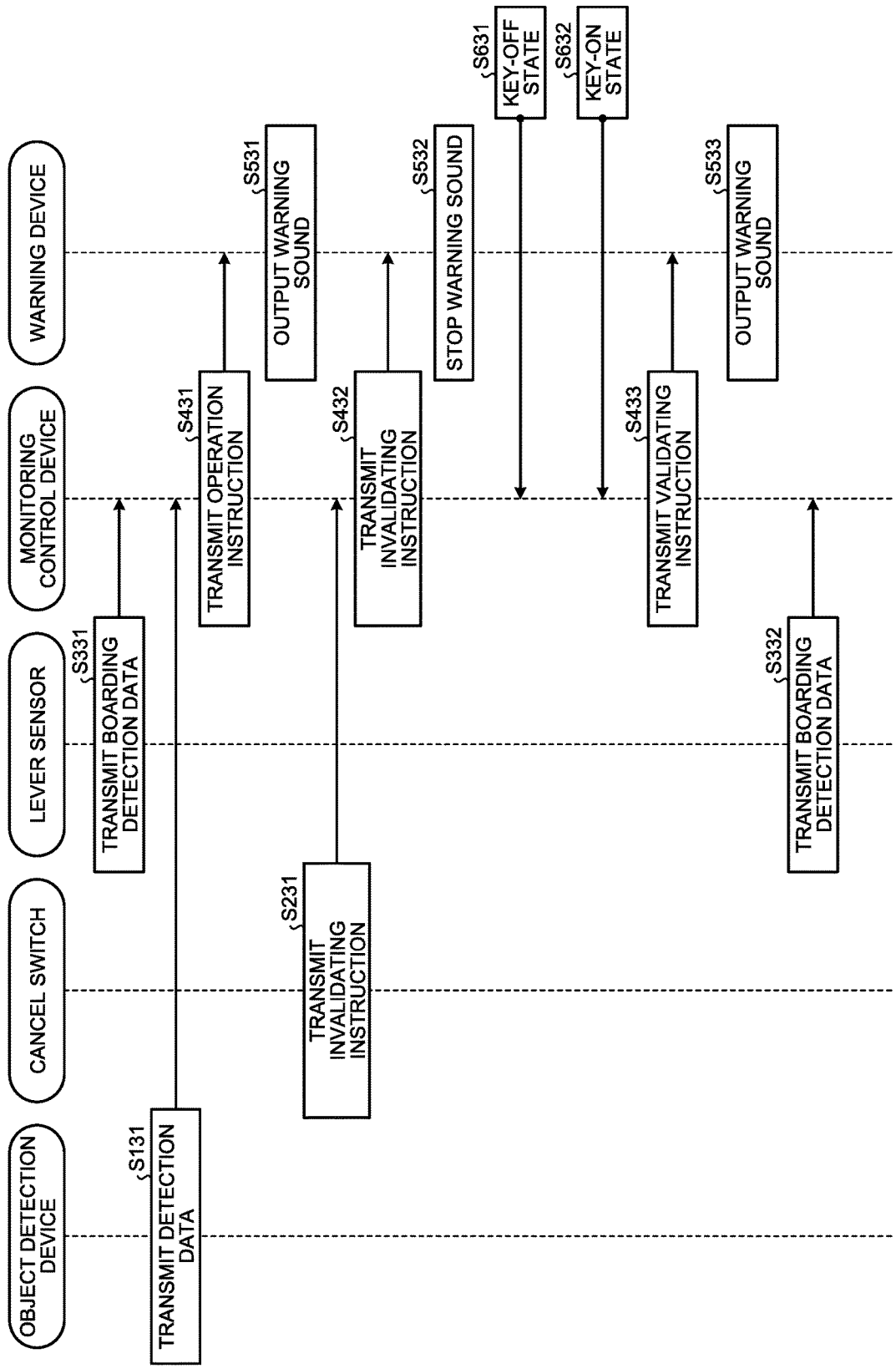
FIG. 11 is a sequence diagram illustrating an example of a periphery monitoring process according to a fourth embodiment.

FIG. 11 is a sequence diagram illustrating an example of the periphery monitoring process according to the periphery monitoring method of the embodiment. Since steps S131, S231, S331, S431, S432, S531, and S532 illustrated in FIG. 11 have the same processes and procedures as those of steps S101, S201, S301, S401, S402, S501, and S502 described with reference to FIG. 8, a description thereof will be omitted.

After the cancel switch 33 is operated by the operator to stop the output of the warning sound from the warning device 31, the operator getting on the driving room 3R leaves from the driving room 3R for the replacement with another operator. The operator who is going to leave from the driving room 3R moves the working machine locking switch 41 from the free position to the lock position and moves the steering locking lever 42 from the free position F2 to the lock position L2. Further, in a case where the operator leaves from the driving room 3R, the operator sets the key-off state (step S631).

After the previous operator has left from the driving room 3R, the next operator gets on the driving room 3R. The operator getting on the driving room 3R sets the key-on state (step S632).

When the power source 70 is activated by the key-on operation, an activation signal representing a state where the power source 70 is activated is output from the power source 70 to the monitoring control device 60. The validating unit 66 acquires the activation signal. The validating unit 66 validates the invalidated operation instruction in a case where the key-on state is set. The warning control unit 68 transmits a valid instruction representing a state where the operation instruction is validated to the warning device 31 (step S433).

The warning device 31 changes from a state where the warning sound cannot be output to a state where the warning sound can be output based on the valid instruction transmitted from the warning control unit 68. The warning device 31 outputs a warning sound (step S533).

The operator moves the steering locking lever 42 from the lock position L2 to the free position F2 and moves the working machine locking switch 41 from the lock position to the free position. The lever sensor 43 transmits the boarding detection data to the monitoring control device 60 (step S332).

In this way, in the embodiment, the specific boarding state includes a state where the operation instruction is invalidated in the key-on state, the first passenger leaves from the driving room 3R in the key-off state, and the second passenger gets on the driving room 3R to set the key-on state again.

In a case where the operation instruction is invalidated in the key-on state (step S432), the first passenger leaves from the driving room 3R in the key-off state (step S631), and the second passenger gets on the driving room 3R to set the key-on state again (step S632), the validating unit 66 validates the invalidated operation instruction.

As described above, the invalidated operation instruction may be validated at a time point at which the key-on state is set again. Also in the embodiment, the output of the unnecessary warning sound is suppressed and the necessary warning sound is output.

In the embodiment, the validating unit 66 acquires an activation signal representing a state where the power source 70 is activated and validates the invalidated operation instruction only when the key-on state is set. For example, when the invalidated operation instruction is validated at a time point at which the key-on state is set again (step S632) regardless of the elapse time from a time point (step S432) at which the invalidating instruction is transmitted or the elapse time from a time point (step S631) at which the key-off state is set, the output of the unnecessary warning sound is suppressed and the necessary warning sound is output when the next operator gets on the driving room 3R.

Fifth Embodiment

In the above-described embodiment, the work vehicle 1 is a wheel loader. The work vehicle 1 may be a work vehicle with the working machine 10. As the work vehicle 1, not only the wheel loader, but also, for example, at least one of an excavator, a bulldozer, and a motor grader can be exemplified.

Figure 12:
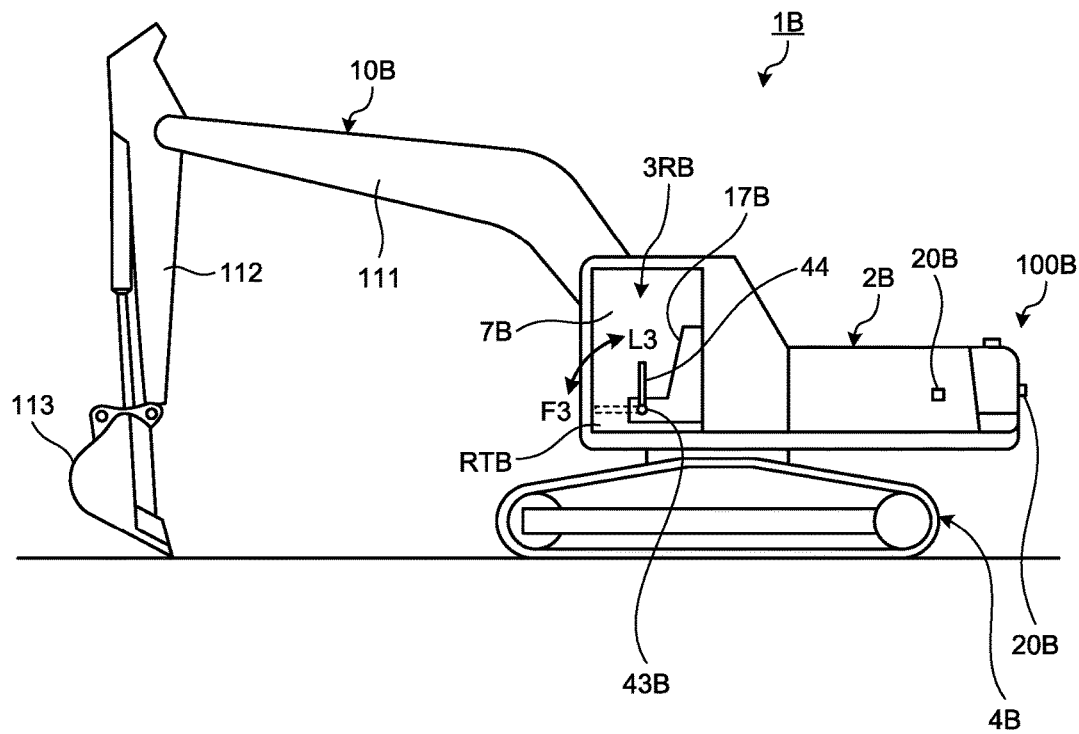
FIG. 12 is a side view illustrating an example of a work vehicle according to a fifth embodiment.

FIG. 12 is a side view illustrating an example of a work vehicle 1B according to the embodiment. FIG. 12 illustrates an example in which the work vehicle 1B is the excavator. The excavator 1B includes a traveling device 4B which includes a crawler, a swing body 2B which serves as a vehicle body supported by the traveling device 4B, and a working machine 10B which is supported by the swing body 2B. The working machine 10B includes a boom 111, an arm 112, and a bucket 113.

Further, the excavator 1B includes a periphery monitoring system 100B which monitors a state in the periphery of the excavator 1B. The periphery monitoring system 100B includes an object detection device 20B. An outer surface of the swing body 2B of the excavator 1B is provided with a plurality of cameras and a plurality of non-contact sensors as the object detection device 20B. The object detection device 20B may be a single camera and a single non-contact camera. The object detection device 20B may be any one of the camera and the non-contact sensor.

The swing body 2B is provided with a driving room 3RB. The driving room 3RB is provided with a driver seat 17B. The passenger gets on the driving room 3RB through an entrance 7B provided at the left side of the driving room 3RB. Further, the passenger leaves from the driving room 3RB through the entrance 7B.

A locking lever 44 serving as the lock operation device is provided in a boarding passage RTB used when the passenger gets on the driving room 3RB. The boarding passage RTB connects the entrance 7B and the driver seat 17B. The locking lever 44 is rotatably supported by, for example, a support mechanism provided at the left portion of the driver seat 17B. The locking lever 44 has, for example, a bar shape, one end thereof is connected to the support mechanism, and the locking lever rotates about a portion connected to the support mechanism.

The locking lever 44 is operated to change from one of the passage allowing state of opening the boarding passage RTB and the passage prohibiting state of closing the boarding passage RTB to the other thereof. The locking lever 44 can be switched between the lock position L3 and the free position F3. In FIG. 12, the locking lever 44 located at the lock position L3 is indicated by a solid line and the locking lever 44 located at the free position F3 is indicated by a dashed line. When the locking lever 44 is operated to be disposed at the lock position L3, the swinging of the swing body 2B, the driving of the traveling device 4B, and the driving of the working machine 10B are limited so that the boarding passage RTB enters the passage allowing state. When the locking lever 44 is operated to be disposed at the free position F3, the limiting of the swinging of the swing body 2B, the driving of the traveling device 4B, and the driving of the working machine 10B is released so that the locking lever 44 blocks the boarding passage RTB. Accordingly, the boarding passage RTB enters the passage prohibiting state.

A lever sensor 43B for detecting the operation state of the locking lever 44 is provided. The lever sensor 43B serves as the boarding state detection device for detecting the passenger boarding state in the driving room 3RB. As the lever sensor 43B, a rotary sensor or a proximity sensor capable of detecting a state where the lever sensor 43B is disposed at the lock position L3 or the free position F3 can be used.

Similarly to the above-described embodiments, the driving room 3RB is provided with the cancel switch 33. The monitoring control device 60 provided in the excavator 1B includes the operation instruction output unit 64 which outputs an operation instruction to the warning device 31 provided in the excavator 1B based on the detection data of the object detection device 20B, the invalidating unit 65 which invalidates the operation instruction based on the invalidating instruction output from the cancel switch 33, and the validating unit 66 which validates the invalidated operation instruction based on the detection data of the lever sensor 43B. Also in the embodiment, the output of the unnecessary warning sound can be suppressed and the necessary warning sound can be output.

Additionally, in the work vehicle including at least one working machine of the excavator, the bulldozer, and the motor grader, as described in the fourth embodiment, the invalidated operation instruction may be validated in a case where the operation instruction is invalidated in the key-on state, the first passenger leaves from the driving room 3R in the key-off state, and the second passenger gets on the driving room 3R to set the key-on state again.

Other Embodiments

In the above-described embodiments, the boarding state detection devices detecting the passenger boarding states of the driving rooms 3R and 3RB are the lever sensors 43 and 43B for detecting the operation states of the steering locking lever 42 and the locking lever 44. As the boarding state detection device for detecting the specific boarding state of the passenger, the following example can be used. For example, the boarding state detection device may be a seat sensor provided in the driver seat 17. The seat sensor detects whether the passenger sits on the driver seat 17. As the seat sensor, for example, a pressure sensor detecting a weight of the passenger can be used. The determination unit 67 can determine whether the passenger gets on the driving room 3R based on the detection data of the seat sensor. Further, the boarding state detection device may be a thermograph capable of detecting infrared light emitted from the passenger existing in the driving room 3R. The determination unit 67 can determine whether the passenger gets on the driving room 3R by analyzing the detection data of the thermograph. Further, the boarding state detection device may be a photographing device which acquires an image of the passenger existing in the driving room 3R. The determination unit 67 can determine whether the passenger gets on the driving room 3R by processing an image acquired by the photographing device. In addition, as the boarding state detection device, for example, a biometric recognition device such as a fingerprint authentication device may be used.

[Computer System]

Figure 13:
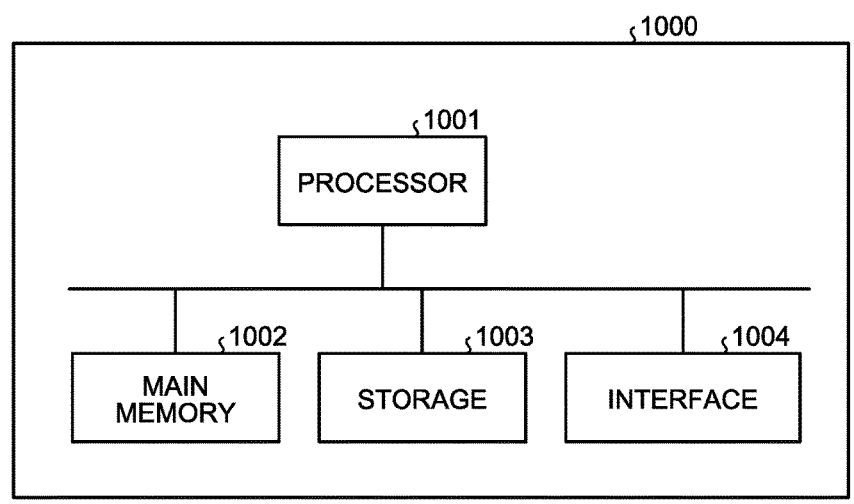
FIG. 13 is a block diagram illustrating an example of a computer system.

FIG. 13 is a block diagram illustrating an example of a computer system 1000. Each of the vehicle control device 50 and the monitoring control device 60 includes the computer system 1000. The computer system 1000 includes a processor 1001 such as a central processing unit (CPU), a main memory 1002 including a non-volatile memory such as a Read Only Memory (ROM) and a volatile memory such as a Random Access Memory (RAM), a storage 1003, and an interface 1004 including an input and output circuit. The function of the vehicle control device 50 and the function of the monitoring control device 60 are stored in the storage 1003 as a program. The processor 1001 reads the program from the storage 1003, develops the program in the main memory 1002, performs the above-described process according to the program. In addition, the program may be transmitted to the computer system 1000 via a network.

REFERENCE SIGNS LIST

1 WHEEL LOADER (WORK VEHICLE)
2 VEHICLE BODY
2F FRONT VEHICLE BODY PART
2R REAR VEHICLE BODY PART
3 CAB
3R DRIVING ROOM
4 TRAVELING DEVICE
5 VEHICLE WHEEL
5F FRONT WHEEL
5R REAR WHEEL
6 TIRE
6F FRONT TIRE
6R REAR TIRE
7 ENTRANCE
8 STEP
8H HANDRAIL
9 ARTICULATION MECHANISM
10 WORKING MACHINE
11 BOOM
12 BUCKET
12B TIP PORTION
13 BOOM CYLINDER
14 BUCKET CYLINDER
15 BELL CRANK
16 LINK
17 DRIVER SEAT
18 DRIVING OPERATION DEVICE
18A ACCELERATOR PEDAL
18B RIGHT BRAKE PEDAL
18C LEFT BRAKE PEDAL
18D STEERING LEVER
18E FORWARD/REVERSE CHANGEOVER SWITCH
18F SHIFT-DOWN SWITCH
18G SHIFT-UP SWITCH
18H BOOM OPERATION LEVER
18I BUCKET OPERATION LEVER
20 OBJECT DETECTION DEVICE
21 CAMERA
21A, 21B, 21C, 21D, 21E, 21F CAMERA
22 NON-CONTACT SENSOR
22A, 22B, 22C, 22D NON-CONTACT SENSOR
25 START SWITCH
26 PARKING BRAKE SWITCH
27 MONITOR DEVICE
28 REAR VIEW MONITORING DEVICE
30 MONITORING MONITOR DEVICE
31 WARNING DEVICE
32 DISPLAY DEVICE
32A FIRST AREA
32B SECOND AREA
33 CANCEL SWITCH (CANCEL OPERATION DEVICE)
34 MARK
35 INDICATOR
36 ICON
40 LOCK OPERATION DEVICE
41 WORKING MACHINE LOCKING SWITCH
42 STEERING LOCKING LEVER
42A SUPPORT PILLAR PORTION
42B ARM PORTION
42C HANDLE PORTION
43 LEVER SENSOR (BOARDING STATE DETECTION DEVICE)
50 VEHICLE CONTROL DEVICE
51 BOARDING STATE COMMUNICATION UNIT
52 OPERATION CONTROL UNIT
60 MONITORING CONTROL DEVICE
61 BOARDING STATE RECEIVING UNIT
62 INVALIDATING INSTRUCTION RECEIVING UNIT
63 OBSTACLE DETECTION UNIT
64 OPERATION INSTRUCTION OUTPUT UNIT
65 INVALIDATING UNIT
66 VALIDATING UNIT
67 DETERMINATION UNIT
68 WARNING CONTROL UNIT
69 DISPLAY CONTROL UNIT
70 POWER SOURCE
100 PERIPHERY MONITORING SYSTEM
BI BIRD'S EYE IMAGE
CG CHARACTER IMAGE
FX ROTATION AXIS
RX ROTATION AXIS
La, Lb, Lc LINE
LG LINE
RT BOARDING PASSAGE
RS GROUND

The invention claimed is:

1. A work vehicle periphery monitoring system comprising:
an operation instruction output unit which outputs an operation instruction to a warning device provided in a work vehicle based on detection data of an object detection device detecting an object in a periphery of the work vehicle, the operation instruction causing the warning device to output a warning;
an invalidating unit which invalidates the operation instruction to disable output operation of the warning device based on an invalidating instruction output from a cancel operation device provided in a driving room of the work vehicle; and
a validating unit which validates the invalidated operation instruction to enable output operation of the warning device based on detection data of a boarding state detection device detecting a specific boarding state of a passenger in the driving room.

2. The work vehicle periphery monitoring system according to claim 1,
wherein the specific boarding state of the passenger includes an operation state of a lock operation device which is provided in a boarding passage of the driving room and is operated by the passenger to limit driving of a driving mechanism of the work vehicle.

3. The work vehicle periphery monitoring system according to claim 2,
wherein the lock operation device is operated so that one of a passage allowing state of the boarding passage by the passenger and a passage prohibiting state of the boarding passage by the passenger is changed to the other thereof, and
the validating unit validates the invalidated operation instruction in a case where the lock operation device in the passage prohibiting state is operated to the passage allowing state and is operated to the passage prohibiting state again.

4. The work vehicle periphery monitoring system according to claim 2,
wherein the lock operation device is operated so that one of a passage allowing state of the boarding passage by the passenger and a passage prohibiting state of the boarding passage by the passenger is changed to the other thereof, and
the validating unit validates the invalidated operation instruction in a case where the lock operation device in the passage prohibiting state is operated to the passage allowing state.

5. The work vehicle periphery monitoring system according to claim 1, further comprising:
a determination unit which determines whether the passenger gets on the driving room based on the detection data of the boarding state detection device, and
wherein the validating unit validates the invalidated operation instruction when it is determined that after a first passenger leaves from the driving room, a second passenger gets on the driving room.

6. The work vehicle periphery monitoring system according to claim 1, further comprising:
a determination unit which determines whether the passenger gets on the driving room based on the detection data of the boarding state detection device,
wherein the validating unit validates the invalidated operation instruction when it is determined that a first passenger has left from the driving room.

7. The work vehicle periphery monitoring system according to claim 1, further comprising:
a display control unit which displays display data representing a state where the operation instruction is valid or invalid on a display device provided in the driving room.

8. The work vehicle periphery monitoring system according to claim 1,
wherein the validating unit validates the invalidated operation instruction based on the detection data of the boarding state detection device in a case where after the operation instruction is invalidated in a key-on state where a power source of the work vehicle is operated, and a key-off state is set in which the operation of the power source of the work vehicle is stopped, the key-on state is set again.

9. A work vehicle periphery monitoring system comprising:
an operation instruction output unit which outputs an operation instruction to a warning device provided in a work vehicle with a working machine based on detection data of an object detection device detecting an object in a periphery of the work vehicle, the operation instruction causing the warning device to output a warning;
an invalidating unit which invalidates the operation instruction to disable output operation of the warning device based on an invalidating instruction output from a cancel operation device provided in a driving room of the work vehicle in a key-on state where a power source of the work vehicle is operated; and
a validating unit which validates the invalidated operation instruction to enable output operation of the warning device in a case where the key-on state is set again after a key-off state is set in which the operation of the power source is stopped.

10. The work vehicle periphery monitoring system according to claim 9,
wherein the validating unit acquires an activation signal representing a state where the power source is activated and validates the invalidated operation instruction only when it is determined that the key-on state is set.

11. A work vehicle periphery monitoring method comprising:
outputting an operation instruction to a warning device provided in a work vehicle based on detection data of an object in a periphery of the work vehicle, the operation instruction causing the warning device to output a warning;
invalidating the operation instruction to disable output operation of the warning device based on an invalidating instruction output from a cancel operation device provided in a driving room of the work vehicle; and
validating the invalidated operation instruction to enable output operation of the warning device based on detection data in which a specific boarding state of a passenger in the driving room is detected.

* * * * *